(12) United States Patent
Takahashi

(10) Patent No.: US 8,724,229 B2
(45) Date of Patent: May 13, 2014

(54) DECENTERED OPTICAL SYSTEM, AND IMAGE DISPLAY APPARATUS AND IMAGING APPARATUS USING THE DECENTERED OPTICAL SYSTEM

(75) Inventor: Koichi Takahashi, Shibuya-ku (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 13/558,597

(22) Filed: Jul. 26, 2012

(65) Prior Publication Data

US 2013/0027784 A1  Jan. 31, 2013

(30) Foreign Application Priority Data

Jul. 29, 2011  (JP) .................................. 2011-166217

(51) Int. Cl.
*G02B 13/10* (2006.01)
*G02B 27/01* (2006.01)

(52) U.S. Cl.
CPC ............. *G02B 13/10* (2013.01); *G02B 27/01* (2013.01)
USPC .......................................... 359/669; 359/720

(58) Field of Classification Search
CPC ......... G02B 13/10; G02B 27/01; G02B 27/18
USPC .......................................... 359/669, 720, 737
See application file for complete search history.

(56) References Cited

U.S. PATENT DOCUMENTS 5,745,295 A * 4/1998 Takahashi .................... 359/631

FOREIGN PATENT DOCUMENTS

| JP | 09-146036 | 6/1997 |
|---|---|---|
| JP | 2002-221688 | 8/2002 |
| JP | 2002-244075 | 8/2002 |
| JP | 2002-311378 | 10/2002 |
| JP | 2002-318366 | 10/2002 |
| JP | 2003-015041 | 1/2003 |
| JP | 2010-092061 | 4/2010 |

* cited by examiner

*Primary Examiner* — Darryl J Collins
(74) *Attorney, Agent, or Firm* — Kenyon & Kenyon LLP

(57) ABSTRACT

A decentered optical system includes a decentered prism which is located in opposition to the image display device, in which there are at least three optical surfaces mutually decentered with at least two thereof being in rotationally asymmetric shape, and which is filled inside with a medium having a refractive index of greater than 1, and a decentered lens which is interposed between the viewer's eyeball and the decentered prism, and is made up of mutually decentered two surfaces and filled inside with a medium having a refractive index of greater than 1, and in which on the image display device side with respect to an on-axis chief ray incident from the center of the image display device on the center of an exit pupil, there is a lens portion having positive power, and on an opposite side thereof, there is a lens portion having negative power.

10 Claims, 18 Drawing Sheets

DECENTERED OPTICAL SYSTEM, AND IMAGE DISPLAY APPARATUS AND IMAGING APPARATUS USING THE DECENTERED OPTICAL SYSTEM

BACKGROUND OF THE INVENTION

The present invention relates to a decentered optical system comprising a decentered lens and a decentered prism using a rotationally asymmetric surface, and an image display apparatus and an imaging apparatus using that decentered optical system.

So far, there has been a head-mounted type image display apparatus known that uses small-format display devices wherein original images on these display devices are enlarged by a viewing optical system to present them to a viewer. This head-mounted type image display apparatus is still required to decrease in the whole size and weight because of being mounted on the head for use. In order to impart a more realistic effect to the image presented, there is demand toward an optical system that can present the original image on the display device to the viewer at the widest possible angle of view and express it with high resolution.

One means for meeting such demand is embodied by an optical system for guiding a light beam from a display device into the viewer's eyeball, and it is especially effective for viewing at a wide angle of view that a prism optical system is located between the display device and the viewer's eyeball together with an optical element made up of two refracting surfaces or a so-called lens. For instance, JP(A)'s 2002-221688, 2002-244075, 2002-311378, 2002-318366, 2003-15041, 2010-92061 and 9-146036 disclose optical systems, each comprising a decentered prism combined with a refractive optical system (lens or the like).

SUMMARY OF THE INVENTION

According to one aspect of the invention, there is a decentered optical system provided that projects an original image on an image display device onto the viewer's eyeball as a virtual image, the decentered optical system comprising:

a decentered prism which is located in opposition to the image display device, in which there are at least three optical surfaces mutually decentered with at least two thereof being in rotationally asymmetric shape, and which is filled inside with a medium having a refractive index of greater than 1, and a decentered lens which is interposed between the viewer's eyeball and the decentered prism, and is made up of mutually decentered two surfaces and filled inside with a medium having a refractive index of greater than 1, and in which on the image display device side with respect to an on-axis chief ray incident from the center of the image display device on the center of an exit pupil, there is a lens portion having positive power, and on an opposite side thereof, there is a lens portion having negative power.

The requirements for, and the advantages of, the aforesaid arrangement will now be explained. For convenience in design, they will be explained along an optical path taken by back tracing where light rays are traced back from the position of the viewer's pupil toward the image display device.

One aspect of the invention is now explained with reference to the arrangements or constructions of Examples 1, 2 and 3 shown in FIGS. 1, 2 and 3 illustrative of the results of back ray tracing that defines light rays traveling back from the side of the viewer's eyeball indicated at 2 toward the image display device indicated at 5. In FIGS. 1, 2 and 3, reference numeral 2 is indicative of the viewer's eyeball, 21 the exit pupil, 3 the decentered optical system, 30 the decentered lens, 40 the decentered prism, 5 the image display device, and 22 the on-axis chief ray (the viewer's axis of vision) incident from the image display device 5 on the center of the exit pupil 21.

In the optical system according to one aspect of the invention, there is the prism optical system 40 used that comprises at least three surfaces with a medium interposed between them, having a refractive index of greater than 1: a first surface 41, a second surface 42 and a third surface 43. The third surface 43 works as a reflecting surface for letting a light beam exiting out of the image display device 5 enter the aforesaid medium; the second surface 42 works as an internal reflection surface having mainly positive power; and the first surface 41 has two actions: making the light exit out of the prism optical system 40, and internal reflection of the light incident form the third surface 43. The thus located prism optical system 40 allows the viewing optical system to be in more compact form, and makes surer correction of aberrations.

Reference is here made to the merits obtained from the use of such decentered optical system 3 in general, and the internal-reflection decentered prism 40. A refractive optical element like a lens is allowed to have power for the first time by imparting curvature to its boundary surface. Accordingly, upon refraction of light rays at that boundary surface, there are chromatic aberrations unavoidably produced due to the chromatic dispersion of the refractive optical element. As a result, another refractive optical system is commonly added to the first-mentioned optical element for the purpose of correcting chromatic aberrations.

On the other hand, a reflective optical element such as a mirror or prism is principally free of chromatic aberrations even with power imparted to its reflecting surface, eliminating the need for adding another optical element to it only the purpose of correcting chromatic aberrations. For this reason, the optical system using the reflective optical element could have a more reduced optical elements count than an optical system using the refractive optical element in view of correction of chromatic aberrations.

At the same time, the reflective optical system using the reflective optical element could be more reduced in its own size than the refractive optical system because the optical path involved can be folded up. However, the reflecting surface is required to have higher precision for assembling adjustment because of having higher sensitivity to errors than the refracting surface.

For a prism among the reflective optical elements, however, it is unnecessary to have higher assembling precision and more adjustment steps than required, because its respective surfaces take relatively fixed positions so that decentration can be controlled by itself. In addition, the prism comprises an entrance surface and an exit surface, both being refracting surfaces, and a reflecting surface; so it has greater flexibility in correction of aberrations than a mirror having only a reflecting surface. In particular, if a substantial portion of the desired power is allocated to the reflecting surface and the powers of the refracting surfaces or the entrance surface and exit surface are kept low, it is then possible to make chromatic aberrations much lower in sharp contrast to the refractive optical element such as a lens while the flexibility in correction of aberrations is kept higher than could be achieved with the mirror. Moreover, the prism is filled inside with a transparent medium higher in refractive index than air so that the optical path can be taken longer than in air, making the optical system thinner and smaller than could be achieved with a lens or mirror located in air. Referring here to a viewing optical system, it is required to have good imaging capability as far as its periphery, to say nothing of that at its center.

In one aspect of the invention, therefore, one decentered prism 40 is used in the decentered optical system 3 forming part of the viewing optical system, as described above. That decentered prism 40 at least comprises the third surface 43 through which image light exiting out of the image display device 5 enters the decentered prism 40, the second surface 42 adapted to reflect a light beam incident from that third surface 43, and the first surface 41 through which the reflected light beam goes out, wherein the first surface 41 is also operable to internally reflect light incident out of the third surface 43. In the thus constructed decentered prism 40, the two reflecting surfaces: the second surface 42 and the third surface 43 are configured in such rotationally asymmetric curved surface shape as to impart optical power to them and make correction of decentration aberrations, thereby making it possible to make good correction of not only center aberrations but also off-axis aberrations. With such a basic arrangement, it is possible to achieve a small-format image display apparatus that is more reduced in terms of an optical elements count than an optical system using a refractive optical system or a rotationally symmetric relay optical system, and has good performance from the center as far as the periphery thereof.

For back ray tracing here, suppose that the on-axis chief ray 22 is defined by a light ray passing through the center of the exit pupil 21 and arriving at the center of the display surface of the image display device 5. With at least one reflecting surface of the decentered prism 40 not decentered with respect to the on-axis chief ray 22, the incident and reflected on-axis chief rays 22 will take the same optical path: they will be interrupted or shielded in the optical system. As a result, only the light beam shielded off at the center will be imaged; so the center will get dark or no image will be formed at the center whatsoever. As a matter of course, a powered reflecting surface may be decentered with respect to the on-axis chief ray.

In one aspect of the invention, the reflecting surfaces forming a part of the decentered prism 40 are configured in such rotationally asymmetric curved surface shape as to give optical power to light beams and make correction of decentration aberrations, as described above. Such surface shape is preferable for correction of decentration aberrations. The reasons will be described just below.

First of all, the coordinate system and rotationally asymmetric surfaces used are explained. The Z-axis is defined by an optical axis provided by a straight line formed by the on-axis chief ray 22 going to a point of intersection with the first surface 31 of the decentered optical system; the Y-axis is defined by an axis that is orthogonal to that Z-axis and lies in each of the decentered surface portions of the surfaces forming part of the optical system; and the X-axis is defined by an axis that is orthogonal to the aforesaid optical axis and the aforesaid Y-axis alike. The direction of tracing light rays is explained with reference to back ray tracing from the exit pupil 21 toward the image display device 5.

In general, a lens system composed of a spherical lens alone is designed such that spherical aberrations produced at the spherical surfaces are mutually corrected with aberrations such as coma and field curvature at some surfaces thereby reducing those aberrations as a whole. In order to make good correction of aberrations at a fewer surfaces, on the other hand, rotationally asymmetric surfaces or the like may be used. This is to reduce aberrations produced at spherical surfaces on their own. With a decentered optical system, however, it is impossible to correct aberrations (decentration aberrations) produced by decentration of optical surfaces by means of a rotationally symmetric optical system. Included in those decentration aberrations are just only asymmetric distortion and field curvature but also longitudinal astigmatism and coma.

Rotationally asymmetric field curvature is first explained. Light rays incident from an infinite object point on a decentered concave mirror are reflected off and imaged there, and once they have struck upon the concave mirror, the back focal length up to the image plane will become half the radius of curvature of a mirror portion upon which the light rays have struck in the case where there is air on the image side. As shown in FIG. 14, the light reflected off the decentered concave surface forms an image plane that tilts with respect to the on-axis chief ray. It is thus impossible to correct the rotationally asymmetric field curvature with the rotationally symmetric optical system.

In order for the tilting field curvature to be corrected with the concave mirror itself that is the source of producing it, the concave mirror must be built up of a rotationally asymmetric surface. In this case, if the curvature gets tight in the Y-axis positive direction (the refracting power gets strong) and the curvature gets weak in the Y-axis negative direction (the refracting power gets weak), it is then possible to correct that field curvature. If, apart from the concave mirror, a rotationally asymmetric surface having the same action as in the aforesaid arrangement is interposed in the optical system, it is then possible to obtain a flat image plane with a fewer surfaces. For correction of aberrations, the rotationally asymmetric surface should preferably be configured in rotationally asymmetric surface shape having no rotationally symmetric axis both within and without its plane, because of increased flexibility.

Then, the rotationally asymmetric astigmatism is explained. The decentered concave mirror also produces such astigmatism as shown in FIG. 15 with respect to the on-axis light ray in the same way as described above. This astigmatism could be corrected by proper changing of the refracting powers of the rotationally asymmetric surface in the X- and Y-axis directions in the same way as described above.

Finally, the rotationally asymmetric coma is explained. The decentered concave mirror also produces such coma as shown in FIG. 16 with respect to the on-axis light ray in the same way as described above. This coma could be corrected by changing the tilt of the rotationally asymmetric surface with an increasing distance from the origin of its X-axis and properly changing the tilt of the surface depending on the positive and negative of the Y-axis. The imaging optical system according to one aspect of the invention could be designed such that at least one surface having the aforesaid reflection feature is decentered with respect to the on-axis chief ray and the rotationally asymmetric surface shape is allowed to have power. With such an arrangement, power is imparted to that reflecting surface so that decentration aberrations produced there can be corrected with that surface itself, and the power of the refracting surface of the prism is so slackened that chromatic aberrations can be reduced on their own.

The aforesaid rotationally asymmetric surface used herein should preferably be a free-form surface symmetric with respect to a plane that has only one symmetric plane. Note here that the free-form surface used herein is defined by the following formula (a). Suppose here that the Z-axis of that defining formula is the axis of the free-form surface.

$$Z = (r^2/R)/[1+\sqrt{\{1-(1+k)(r/R)^2\}}]$$

$$+ \Sigma C j X^m Y^n$$

$$j=1 \quad \text{(a)}$$

Here the first term of Formula (a) is the spherical term, and the second term is the free-form surface term.

In the spherical term,
R is the radius of curvature of the vertex,
k is the conic constant, and
r is $\sqrt{(X^2+Y^2)}$.

The free-form surface term is:

$$\sum_{j=1}^{66} CjX^mY^n = C1 + C2X + C3Y + C4X^2 + C5XY + C6Y^2 + C7X^3 +$$
$$C8X^2Y + C9XY^2 + C10Y^3 + C11X^4 + C12X^3Y + C13X^2Y^2 +$$
$$C14XY^3 + C15Y^4 + C16X^5 + C17X^4Y + C18X^3Y^2 + C19X^2Y^3 +$$
$$C20XY^4 + C21Y^5 + C22X^6 + C23X^5Y + C24X^4Y^2 + C25X^3Y^3 +$$
$$C26X^2Y^4 + C27XY^5 + C28Y^6 + C29X^7 + C30X^6Y + C31X^5Y^2 +$$
$$C32X^4Y^3 + C33X^3Y^4 + C34X^2Y^5 + C35XY^6 + C36Y^7$$

where Cj (j is an integer of 1 or greater) is a coefficient.

In general, that free-form surface has no plane of symmetry in both the X-Z plane and the Y-Z plane. However, by bringing all the odd-numbered degree terms with respect to X down to zero, the free-form surface can have only one plane of symmetry parallel with the Y-Z plane. For instance, this may be achieved by bringing down to zero the coefficients for the terms C2, C5, C7, C9, C12, C14, C16, C18, C20, C23, C25, C27, C29, C31, C33, C35, . . . in the above defining formula (a). Likewise by bringing all the odd-numbered terms with respect to Y down to zero, the free-form surface can have only one plane of symmetry parallel with the X-Z plane. For instance, this may be achieved by bringing down to zero the coefficients for the terms C3, C5, C8, C10, C12, C14, C17, C19, C21, C23, C25, C27, C30, C32, C34, C36, . . . in the above defining formula.

If any one of the directions of the aforesaid plane of symmetry is used as the plane of symmetry and decentration is implemented in a direction corresponding to that, for instance, the direction of decentration of the optical system with respect to the plane of symmetry parallel with the Y-Z plane is set in the Y-axis direction and the direction of decentration of the optical system with respect to the plane of symmetry parallel with the X-Z plane is set in the X-axis direction, it is then possible to improve productivity while, at the same time, making effective correction of rotationally asymmetric aberrations occurring from decentration.

The aforesaid defining formula (a) is given for the sake of illustration alone as mentioned above, and it goes without saying that the same advantages are achievable even with any other defining formulae.

In the decentered prism 40 portion, the angle of light incident on the first surface 41 is preferably set greater than the critical angle such that, in order from the path taken by light exiting out of the image display device 5, it comprises the third surface 43 through which light enters the decentered prism 40, the first surface 41 that reflects off a light beam incident from that third surface 43 and the second surface 42 which light internally reflected off at the first surface 41 enters, wherein the light reflected off at the second surface 42 again goes toward the first surface 41 where the light beam is totally reflected and goes out. However, the area of the first surface 41 through which the light beam does not exit out may be set less than the critical angle. In that case, if the reflecting area of the first surface 41 where no total reflection condition is satisfied is provided with a reflection coating, it is then possible to view the whole screen.

In addition to the decentered prism 40 as described above, the decentered lens 30 that comprises mutually decentered two surfaces, and has a medium, whose refractive index is greater than 1, filled up between both the surfaces is interposed between the viewer's eyeball 2 and the decentered prism 40, whereby aberrations including decentration aberrations produced from two such surfaces can be corrected. Thus, the decentered optical system 3 that comprises a wider-angle-of-view arrangement having high resolving power with well-corrected distortion may be set up as the viewing optical system.

Referring here to the decentered lens 30, one important factor for correction of decentration aberrations at a wide angle of view is that there is a lens portion having positive power on the side of the image display device 5 with respect to the on-axis chief ray 22 (the upper side of FIG. 1: the Y-positive side), and there is a lens portion having negative power on the opposite side (the lower side of FIG. 1: the Y-negative side).

When the decentered prism 40 alone is considered, on the Y-positive side there is light incident early on the first surface 41 of negative power, and the distance up to the second surface 42 is long. On the Y-negative side, conversely, the distance up to the first surface 41 having negative power is long, the distance between the first surface 41 and the second surface 42 of positive power is short, and the distance from the second surface 42 to the third surface 43 is long.

When there is only the decentered prism 40 having such a power profile, there is a principal point positioned more away from the image plane on the Y-positive side than on the Y-negative side. Therefore, there is a lower magnification on the Y-positive side; so there will be decentration distortion produced.

In the decentered lens 30 positioned between the eyeball 2 and the decentered prism 40, therefore, if there is a lens portion having positive power on the Y-positive side (the upper side of FIG. 1) and there is a lens portion having negative power on the opposite Y-negative side (the lower side of FIG. 1), it is then possible to correct the aforesaid decentration distortion.

In the decentered optical system according to the invention, suppose that the Z-axis is defined by an axis provided by a straight line that connects the aforesaid on-axis chief ray exiting out of the aforesaid decentered optical system with the center of the aforesaid exit pupil; the Y-axis is defined by an axis that is orthogonal to the aforesaid Z-axis and lies in each of the decentered surface portions of the surfaces forming the aforesaid decentered optical system; and the X-axis is defined by an axis that is orthogonal to the aforesaid Z-axis and the aforesaid Y-axis alike. The power profile of the aforesaid decentered lens in the Y-direction gets small in descending order of the Y-direction angle of view.

In the decentered lens 30 positioned between the eyeball 2 and the decentered prism 40, there is a lens portion of positive power on the Y-positive side (the upper side of FIG. 1), and there is a lens portion having negative power on the Y-negative side (the lower side of FIG. 1), as described above, whereby the aforesaid decentration distortion can be corrected. In correction of distortion, however, if there is a gradual power change from positive to negative as there is a transition from the Y-positive side to the Y-negative side, then the correction of decentration aberrations grows smoother.

Shown in FIGS. 4, 5 and 6 is how light rays behave when parallel light enters the decentered lens 30 in Example 1, 2, and 3 at the Y-direction angles of view of −20°, −10°, 0°, 10° and 20° (from the lower right). As can be seen from FIGS. 4, 5 and 6, the Y-positive side (the upper right rays in FIGS. 4, 5 and 6) has positive power; the focal length grows long as the Y-direction angle of view gets small; and the parallel light turns into divergent light on the Y-negative side (the lower right in FIGS. 4, 5 and 6).

Suppose again that the Z-axis is defined by an axis provided by a straight line that connects the aforesaid on-axis chief ray exiting out of the aforesaid decentered optical system with the center of the aforesaid exit pupil; the Y-axis is defined by an axis that is orthogonal to the aforesaid Z-axis and lies in each of the decentered surface portions of the surfaces forming the aforesaid decentered optical system; and the X-axis is defined by an axis that is orthogonal to the aforesaid Z-axis and the aforesaid Y-axis alike. The decentered optical system according to the invention satisfies the following condition (1):

$$0.0005 \leq (\phi lenx - \phi lenm)/\phi y \leq 0.015 \quad (1)$$

where $\phi lenx$ is the maximum value of power of the decentered lens, $\phi lenm$ is the minimum value of power of the decentered lens, and $\phi y$ is the power of the whole optical system in the Y-direction.

This condition (1) is provided to limit a power difference depending on the position of the decentered lens 30. As the upper limit of 0.015 is exceeded, it would cause the power difference between top and bottom to grow large and, hence, the power difference throughout the optical system to grow large, resulting in a large field tilt. As the lower limit of 0.0005 is not reached, on the other hand, it would cause the power difference to get small throughout the decentered lens 30. This in turn would render it impossible to make any proper focal length difference between the top and bottom of the decentered lens 30; that would render the focal length on the minus angle-of-view side too short to take hold of the distance from the decentered prism 40 to the image display device 5.

Suppose likewise that the Z-axis is defined by an axis provided by a straight line that connects the aforesaid on-axis chief ray exiting out of the aforesaid decentered optical system with the center of the aforesaid exit pupil; the Y-axis is defined by an axis that is orthogonal to the aforesaid Z-axis and lies in each of the decentered surface portions of the surfaces forming the aforesaid decentered optical system; and the X-axis is defined by an axis that is orthogonal to the aforesaid Z-axis and the aforesaid Y-axis alike. The decentered optical system according to the invention satisfies the following condition (1').

$$0.0008 \leq (\phi lenx - \phi lenm)/\phi y \leq 0.01 \quad (1')$$

where $\phi lenx$ is the maximum value of power of the decentered lens, $\phi lenm$ is the minimum value of power of the decentered lens, and $\phi y$ is the power of the whole optical system in the Y-direction.

The aforesaid condition (1') should more preferably be satisfied.

Suppose likewise that the Z-axis is defined by an axis provided by a straight line that connects the aforesaid on-axis chief ray exiting out of the aforesaid decentered optical system with the center of the aforesaid exit pupil; the Y-axis is defined by an axis that is orthogonal to the aforesaid Z-axis and lies in each of the decentered surface portions of the surfaces forming the aforesaid decentered optical system; and the X-axis is defined by an axis that is orthogonal to the aforesaid Z-axis and the aforesaid Y-axis alike. The decentered optical system according to the invention further satisfies the following condition (2):

$$-4 \leq \phi ylen/\phi y \leq 3 \quad (2)$$

where $\phi ylen$ is the power of the decentered lens in the Y-direction, and $\phi by$ is the power of the whole optical system in the Y-direction.

This condition (2) is provided to limit the power of the decentered lens 30 in the YZ-plane. As the lower limit of −4 is not reached, it would cause the negative power of the lens in the lower YZ-plane to grow too large, resulting in a large field tilt. As the upper limit of 3 is exceeded, it would cause the positive power of the lens in the upper YZ-plane to grow large and the focal length to get short, failing to take hold of the distance from the prism to the display device. Shown graphically in FIG. 7 are the values of Condition (2) in Examples 1, 2 and 3.

Suppose likewise that the Z-axis is defined by an axis provided by a straight line that connects the aforesaid on-axis chief ray exiting out of the aforesaid decentered optical system with the center of the aforesaid exit pupil; the Y-axis is defined by an axis that is orthogonal to the aforesaid Z-axis and lies in each of the decentered surfaces forming the aforesaid decentered optical system; and the X-axis is defined by an axis that is orthogonal to the aforesaid Z-axis and the aforesaid Y-axis alike. The decentered optical system according to the invention further satisfies the following condition (2'):

$$-3 \leq \phi ylen/\phi y \leq 2 \quad (2')$$

where $\phi ylen$ is the power of the decentered lens in the Y-direction, and $\phi y$ is the power of the whole optical system in the Y-direction.

The aforesaid condition (2') should more preferably be satisfied.

Suppose likewise that the Z-axis is defined by an axis provided by a straight line that connects the aforesaid on-axis chief ray exiting out of the aforesaid decentered optical system with the center of the aforesaid exit pupil; the Y-axis is defined by an axis that is orthogonal to the aforesaid Z-axis and lies in each of the decentered surfaces forming the aforesaid decentered optical system; and the X-axis is defined by an axis that is orthogonal to the aforesaid Z-axis and the aforesaid Y-axis alike. The decentered optical system according to the invention further satisfies the following condition (3):

$$-80 \leq flex \cdot fy/fley \cdot fx \leq 40 \quad (3)$$

where flex is the focal length of the decentered lens in the X-direction, fley is the focal length of the decentered lens in the Y-direction, and fy is the focal length of the whole optical system in the Y-direction.

This condition (3) is provided to limit the ratio between the X-direction focal length of the decentered lens 30 with respect to the X-direction focal length of the whole decentered optical system 3 and the Y-direction focal length of the decentered lens 30 with respect to the Y-direction focal length of the whole decentered optical system 3. It follows that as this absolute value remains large, it would cause the X-direction focal length to grow long and the Y-direction focal length to get short, and as it remains small, it would cause the Y-direction focal length to grow long and the X-direction focal length to get short. Wherever the sign is minus, there would be positive and negative power in the X- and Y-directions, respectively.

As the lower limit of −80 is not reached, it would cause the negative power of the decentered lens 30 in the YZ-plane to grow too large, resulting in overcorrection of distortion. As the upper limit of 40 is exceeded, it would cause the positive power of the decentered lens 30 in the upper YZ-plane to grow greater than in the upper XZ-plane, producing astigmatism in a level that could not be corrected at other surfaces. Shown graphically in FIG. 8 are the values of condition (3) in Examples 1, 2 and 3.

Suppose likewise that the Z-axis is defined by an axis provided by a straight line that connects the aforesaid on-axis chief ray exiting out of the aforesaid decentered optical system with the center of the aforesaid exit pupil; the Y-axis is defined by an axis that is orthogonal to the aforesaid Z-axis and lies in each of the decentered surfaces forming the aforesaid decentered optical system; and the X-axis is defined by an axis that is orthogonal to the aforesaid Z-axis and the aforesaid Y-axis alike. The decentered optical system according to the invention satisfies the following condition (3'):

$$-70 \leq \text{flex} \cdot fy / \text{fley} \cdot fx \leq 30 \qquad (3')$$

where flex is the focal length of the decentered lens in the X-direction, fley is the focal length of the decentered lens in the Y-direction, and fy is the focal length of the whole optical system in the Y-direction.

The aforesaid condition (3') should more preferably be satisfied.

In the decentered optical system according to the invention, at least two points of inflection where the power changes from positive to negative or negative to positive are provided in an effective area of the third surface of the aforesaid decentered prism that is an entrance surface.

The third surface of the decentered prism 40 is the one that lies in proximity to the image plane in the back ray tracing for the image display device, and is operable to control the angle of tilt of the exit light rays because of being positioned just in front of the image plane. This surface also acts effectively on correction of distortion that is a sort of off-axis aberrations. Spherical aberrations of the optical system and aberrations ascribable to the brightness of the optical system such as coma are corrected as light travels through the decentered lens 30 to the first and second surfaces of the decentered prism 40, while off-axis aberrations such as field curvature and distortion are corrected at the third surface 43 just in front of the image plane. Field curvature in particular is effectively corrected by making the off-axis power of the third surface 43 negative, and making the near on-axis power of the third surface 43 positive contributes to making the paraxial focal length short and making sure a wide angle of view. To this end, the third surface 43 is configured in convex shape at or near its center and in concave shape on its periphery. In addition, peripheral, delicate off-axis distortion is corrected by controlling the off-axis power of the third surface 43 by its concave-and-convex shape. The shape of the third surface 43 having two points of inflection in Example 1 could be seen from FIG. 1, and the surface shape in Example 3 shown in FIG. 3 is depicted in FIG. 13.

The image display apparatus according to the invention comprises any one of the decentered optical systems as described above, and an image display device located on an image plane in back ray tracing for the aforesaid decentered optical system, wherein the viewer's eye is positioned at an entrance pupil position of the aforesaid decentered optical system.

In order for the inventive decentered optical system to be used as the image display apparatus, it is required to have a support member formed such that it is held on the viewer's head for the purpose of guiding a light beam from the image display device to the viewer's eyeball. Light emitted out of the image display device turns into near parallel light through the prism and lens, providing a total-angle-of-view light beam to the pupil of the viewer's eyeball positioned at the exit pupil position.

With such an arrangement, it is possible to achieve a small-format image display apparatus using a small image display device, wherein the viewer can view an image displayed on the image display device as an enlarged virtual image.

According to the invention, there is an imaging apparatus provided for imaging light coming from an object on an imaging device via an aperture stop and a decentered optical system, wherein the decentered optical system comprises:

a decentered prism which is located in opposition to the image display device, in which at least three optical surfaces are mutually decentered with at least two thereof being in rotationally asymmetric shape, and which is filled inside with a medium having a refractive index of greater than 1, and a decentered lens which is interposed between the aperture stop and the decentered prism, and is made up of mutually decentered two surfaces and filled inside with a medium having a refractive index of greater than 1, and in which on the image display device side with respect to an on-axis chief ray incident from the center of the aperture stop on the center of the imaging device, there is a lens portion having positive power, and on an opposite side thereof, there is a lens portion having negative power.

In Example 1 shown in FIG. 1, if an imaging device such as a CCD is located instead of the image display device 5, and there is an aperture stop located in front of the first surface 31 of the decentered lens 30, which aperture stop has an aperture of circular shape, rectangular shape or like shape, it is then possible to set up an imaging apparatus. Light that passes through the aperture stop, enters the decentered lens 30 from the first surface 31 through the second surface 32, and enters the decentered prism from the first surface is internally reflected off twice at the second and first surfaces, leaving the decentered prism from the third surface and arriving at the imaging device for light collection, thereby taking outward images in the imaging device.

With such an arrangement, it is possible to achieve an imaging apparatus reduced in terms of size and weight. Note here that to this imaging apparatus, too, the decentered optical system arrangement used with the aforesaid image display apparatus may be added.

Advantages of the Invention

According to the present invention, it is possible to achieve a decentered optical system that ensures a wide angle of view and a large exit pupil and makes sure high-resolution images albeit comprising barely 2 optical elements. In addition, it is possible to provide an image display apparatus or imaging apparatus capable of projecting an image on an image display device onto the viewer's eyeball as a virtual image.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Specific numeral Examples 1, 2 and 3 of the invention are now explained. In parameters described later in the respective examples, the on-axis chief ray 22 is defined by a light ray that, in back ray tracing, passes through the center of the exit pupil 21 of the decentered optical system 3 and arrives at the center of the image plane (image display device) 5.

Figure 1:
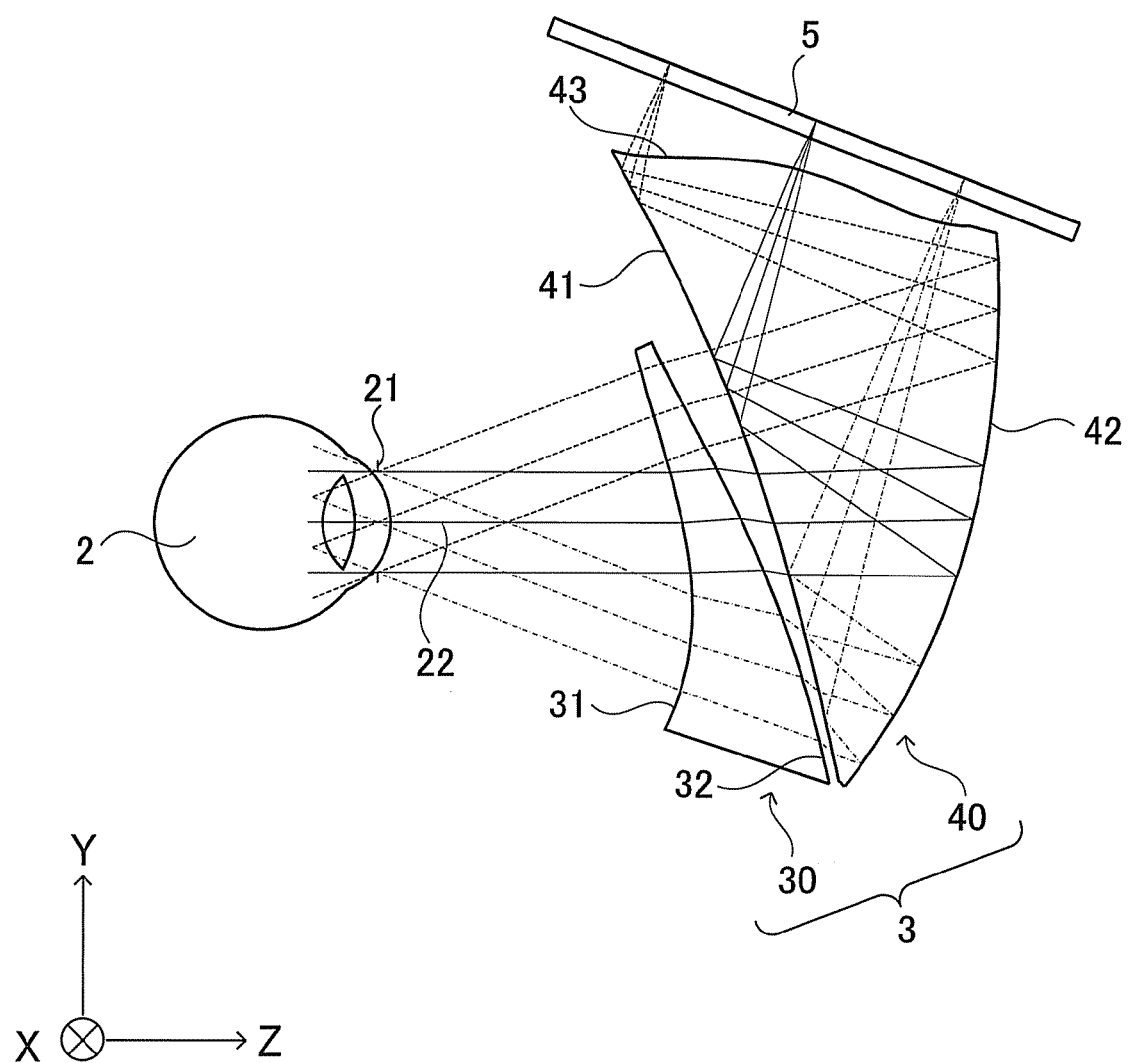
FIG. 1 is illustrative of the arrangement of the image display apparatus (Example 1) according to an embodiment of the invention.
Figure 2:
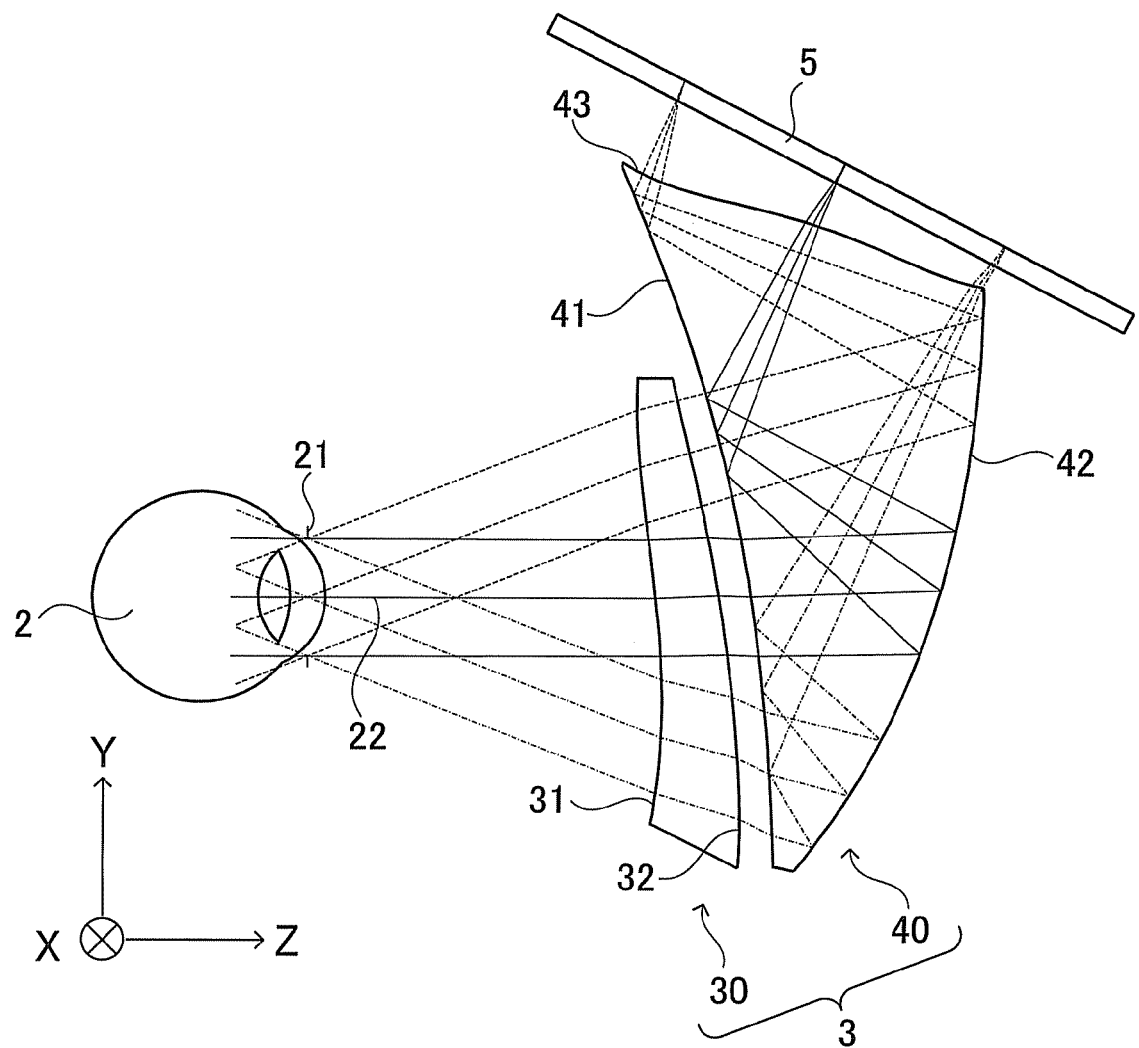
FIG. 2 is illustrative of the arrangement of the image display apparatus (Example 2) according to another embodiment of the invention.
Figure 3:
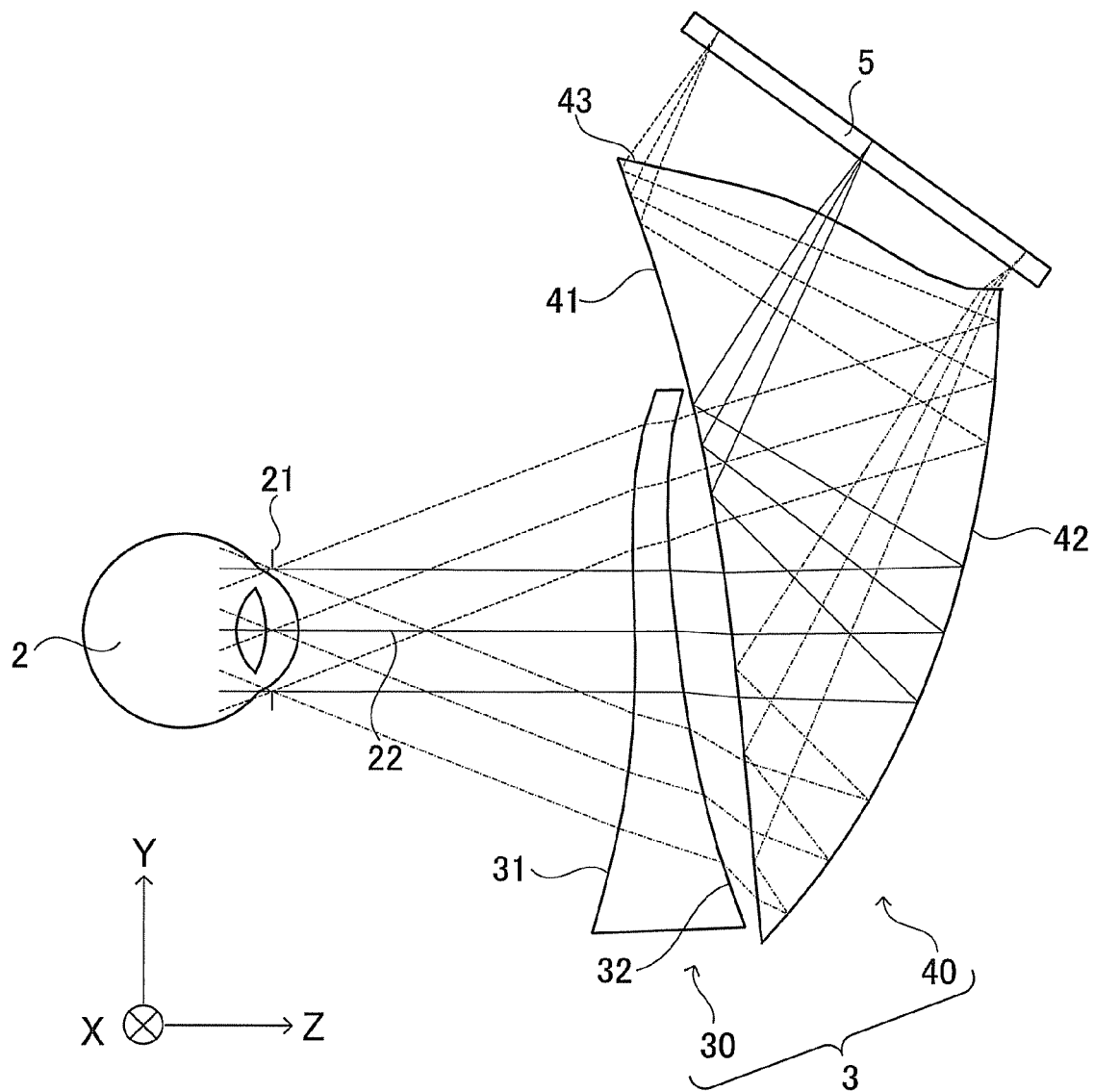
FIG. 3 is illustrative of the arrangement of the image display apparatus (Example 3) according to yet another embodiment of the invention.
Figure 4:
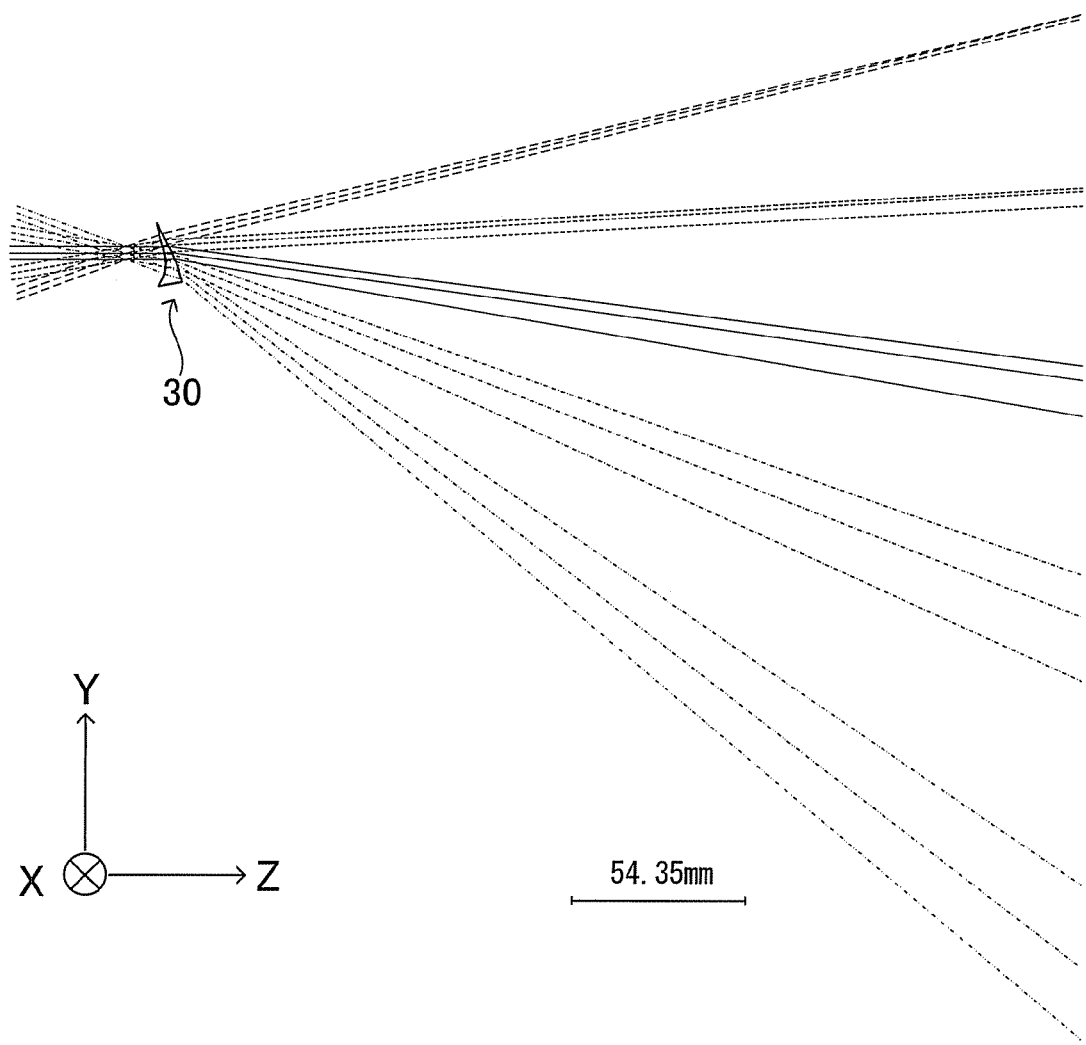
FIG. 4 is illustrative of how parallel light behaves upon incidence on the decentered lens (Example 1) in an embodiment of the invention.
Figure 5:
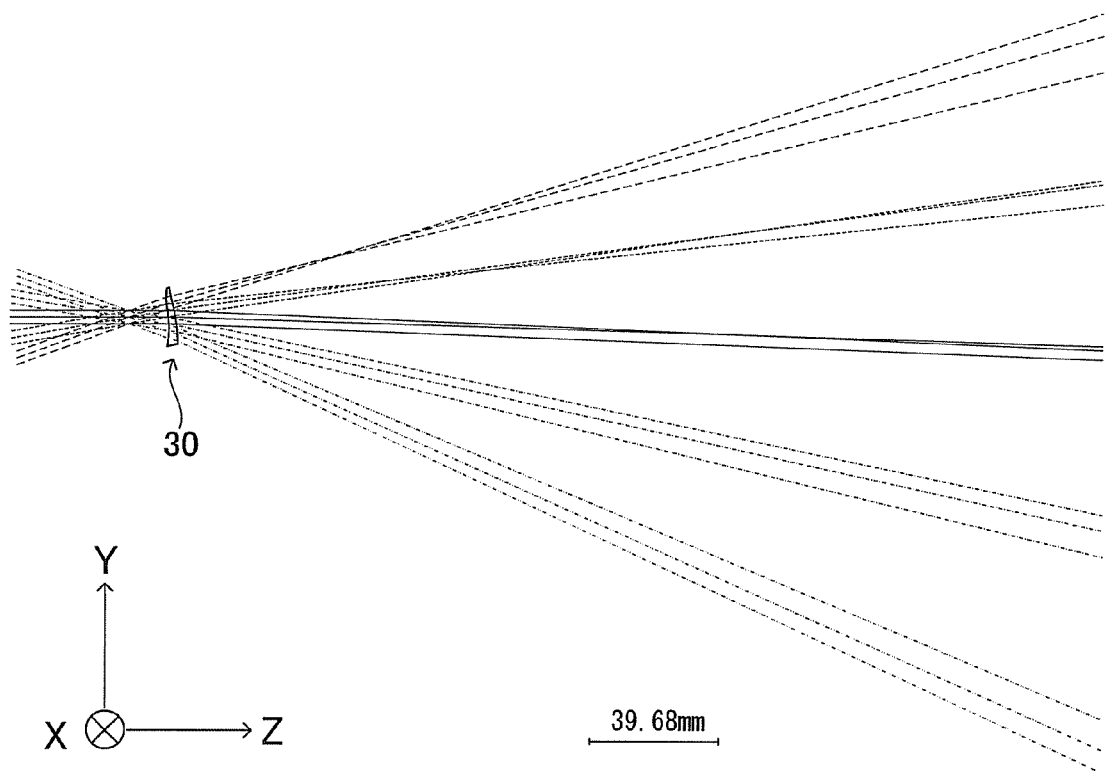
FIG. 5 is illustrative of how parallel light behaves upon incidence on the decentered lens (Example 2) in an embodiment of the invention.
Figure 6:
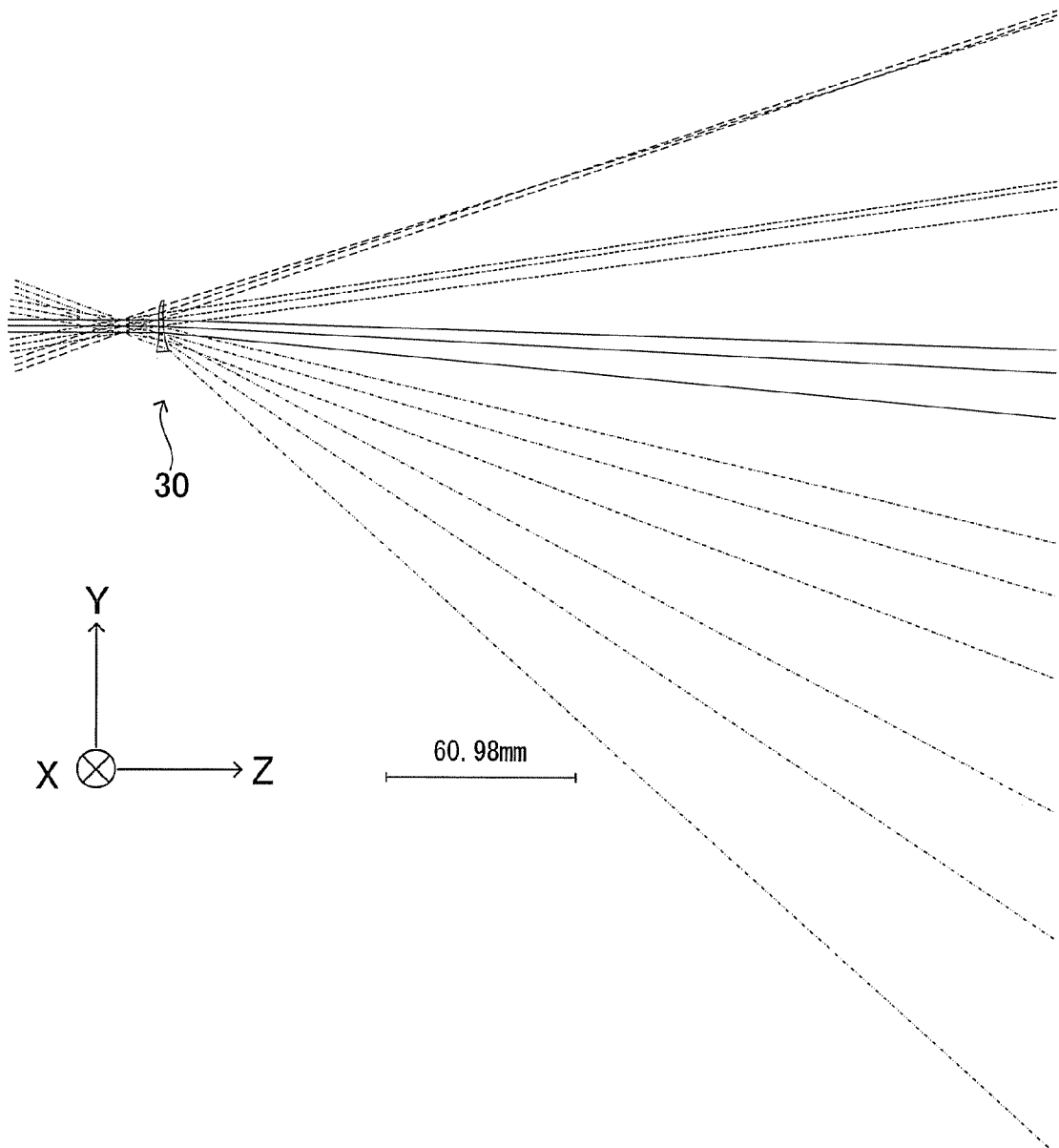
FIG. 6 is illustrative of how parallel light behaves upon incidence on the decentered lens (Example 3) in an embodiment of the invention.
Figure 7:
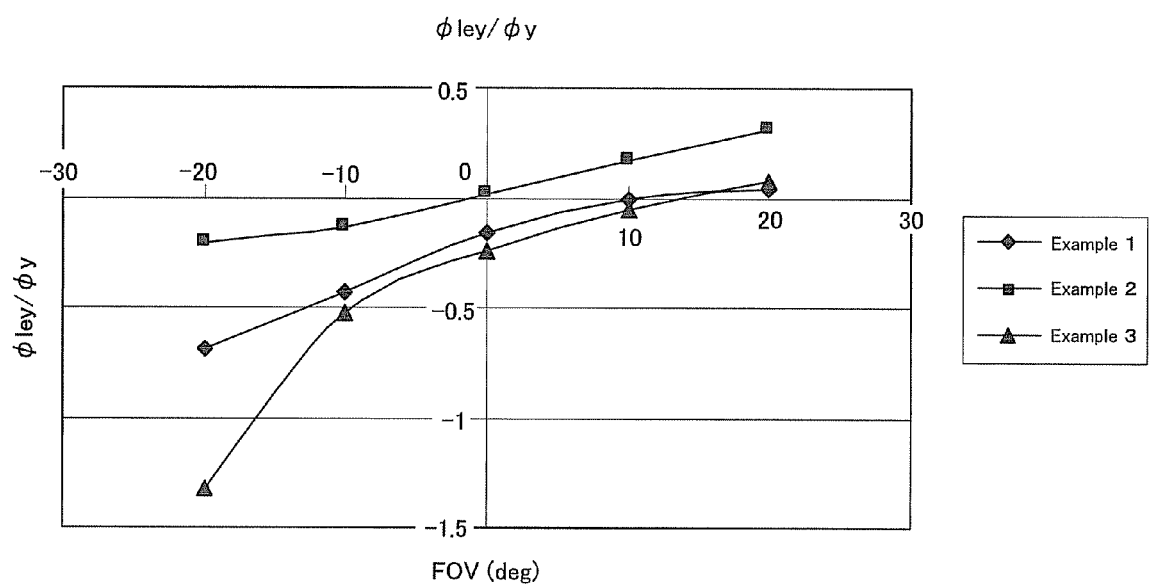
FIG. 7 is indicative of the values of condition (2) in the respective examples of the invention.
Figure 8:
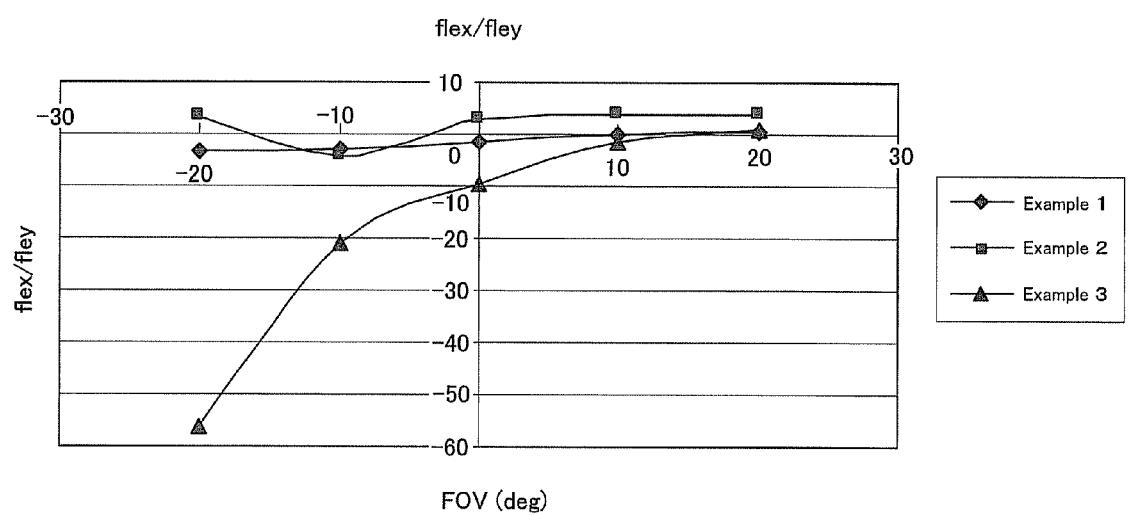
FIG. 8 is indicative of the values of condition (3) in the respective examples of the invention.

In Examples 1, 2 and 3, a direction along the direction of travel of the on-axis chief ray 22 between the decentered lens 30 and the exit pupil 22 is defined as the Z-axis positive direction; a plane including a decentered surface portion of each of the surfaces forming the decentered optical system with this Z-axis is defined as the Y-Z plane; a direction that is orthogonal to the Y-Z plane and comes out the other side of the sheet paper is defined as the X-axis positive direction; and an axis that forms a right-handed orthogonal coordinate system with the X- and Z-axes is defined as the Y-axis. The coordinate systems for Examples 1, 2 and 3 are shown in FIGS. 1, 2 and 3, respectively.

In Examples 1, 2 and 3, the respective surfaces are decentered in that Y-Z plane, and only one symmetric plane of each rotationally asymmetric free-form surface is defined as the Y-Z plane. Given to each decentered surface portion are the amount of decentration of the vertex position of that surface from the center of the origin O of the associated coordinate system (X, Y and Z in the X-, Y- and Z-axis directions) and the angles ($\alpha$, $\beta$, $\gamma$ (°)) of tilt of the center axis (the Z-axis of the aforesaid defining formula (a) with regard to the free-form surface) of that surface about the X-, Y- and Z-axes of the coordinate system. Note here that positive $\alpha$ and $\beta$ mean counterclockwise rotation with respect to the respective axes, and the positive $\gamma$ means clockwise rotation with respect to the positive direction of the Z-axis.

When a specific surface (including a virtual surface) of the optical function surfaces forming the optical system of each example and the subsequent surface form together a coaxial optical system, there is a surface separation given. Besides, the refractive indices and Abbe constants of the media are given as usual. The surface shape of the free-form surface used herein is defined by the aforesaid formula (a), and the Z-axis in that defining formula provides the axis of the free-form surface.

It is also noted that coefficient terms to which data are not given are zero. The refractive indices on a d-line basis (587.56 nm wavelength) are given, and length is given in mm.

FIGS. 1, 2 and 3 are illustrative in the Y-Z section including an optical axis of Examples 1, 2 and 3, respectively.

In Example 1, 2, and 3, a 0.8-inch liquid crystal display device (LCD for short) having a horizontal angle of view of 55° is supposed as the image display device 5, and on the side of the image display device 5, there is the decentered prism 40 used that includes the third surface 43, the first surface 41 for internally reflecting a light beam incident from the third surface 43, the second surface 42 for reflecting a light beam reflected off at the first surface 41 and the first surface 41 through which a light beam reflected off at the second surface 42 exits out, and has an optical path such that light rays do not cross in the prism until exiting out of the first surface 41. The first, second and third surfaces 41, 42 and 43 are each formed of a free-form surface symmetric with respect to a plane. In addition, light rays exiting out of the first surface 41 enter the decentered lens 30 from the second surface 32 where they are refracted, and leave the decentered lens from the first surface 31, forming the exit pupil 21 near the iris of the viewer's eyeball 2.

As shown in FIG. 1, the image display apparatus of Example 1 is built up of the decentered prism 40 and the decentered lens 30, and the decentered prism 40 is made up of three optical surfaces 41, 42 and 43, between which a transparent medium having a refractive index of greater than 1 is filled up. The decentered lens 30 is made up of two optical surfaces 31 and 32, between which a transparent medium having a refractive index of greater than 1 is filled up.

Upon back ray tracing, the on-axis chief ray passing through the exit pupil 21 enters the decentered lens 30 from the entrance transmitting surface 31, transmits through the transparent medium, and exits out of the transmitting surface 32. Then, the chief ray enters the decentered prism 40 from the transmitting, first surface 41, where it is reflected off at the second surface 42 that is an internal reflecting surface having mainly positive power and reflected off at the first surface 41 that acts as an internal reflecting surface. Then, the reflected ray exits out of the decentered prism 40 through the transmitting, third surface 41, and goes through a cover glass on the image display device, arriving at the display surface of the image display device 5 positioned at the image plane position for imaging. Note here that when the angle of incidence of the light ray reflected off at the second surface 42 on the first surface 41 is greater than the critical angle, the light ray is totally reflected at that area. When that angle of incidence on the first surface 41 is less than the critical angle, an aluminum or like reflection film is coated on that area.

It is then important that the area to be coated with the reflection coating do not overlap an area from which the light ray goes toward the image display device 5.

Actually, the display light exiting out of the image display device 5 follows the aforesaid optical path oppositely so that it is enlarged and projected into the viewer's eyeball having the pupil positioned at the position of the exit pupil 21. In Example 1, the transmitting surfaces 31 and 32 of the decentered lens 30 are each in free-form surface shape, and the first surface (combined transmitting and internal reflecting surface) 41, the second surface (internal reflecting surface) 42 and the third surface (transmitting surface) 43 are each in free-form surface shape. The whole optical system has an X-direction paraxial focal length of 14.95 mm, a Y-direction paraxial focal length of 16.16 mm and a pupil diameter $\phi$ of 4.0 mm.

In Example 2, and 3, much the same optical arrangement as in Example 1 uses a similar image display device 5, and the optical path taken by light rays from the exit pupil 21 to the image display device 5 is defined the same way too.

In Example 2, the whole optical system has an X-direction paraxial focal length of 11.43 mm, a Y-direction paraxial focal length of 16.16 mm and a pupil diameter $\phi$ of 4.0 mm.

In Example 3, the whole optical system has an X-direction paraxial focal length of 14.77 mm, a Y-direction paraxial focal length of 15.72 mm and a pupil diameter $\phi$ of 4.0 mm.

Figure 9:
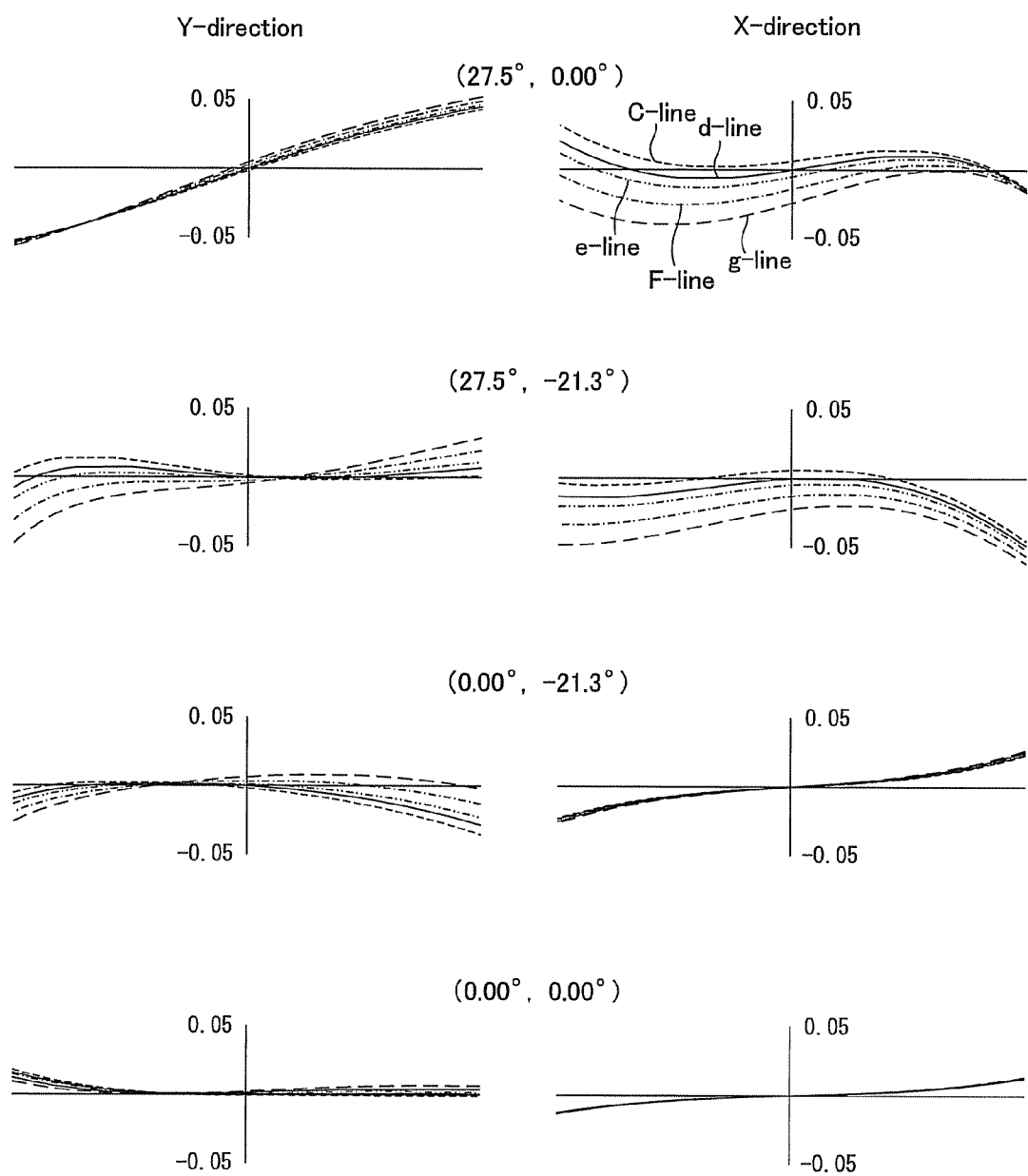
FIG. 9 is a set of aberration diagrams for Example 3 of the invention.
Figure 10:
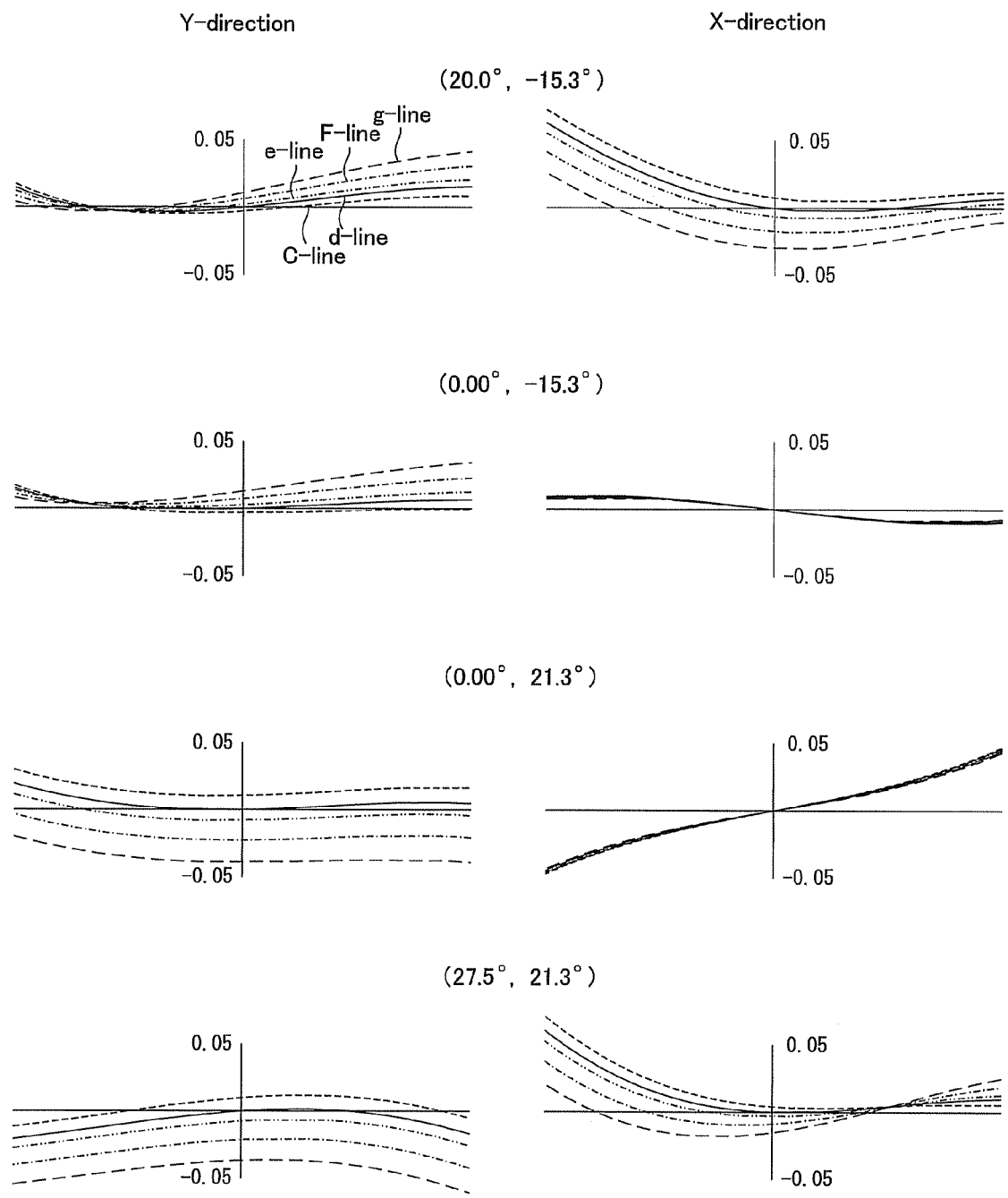
FIG. 10 is a set of aberration diagrams for Example 3 of the invention.
Figure 11:
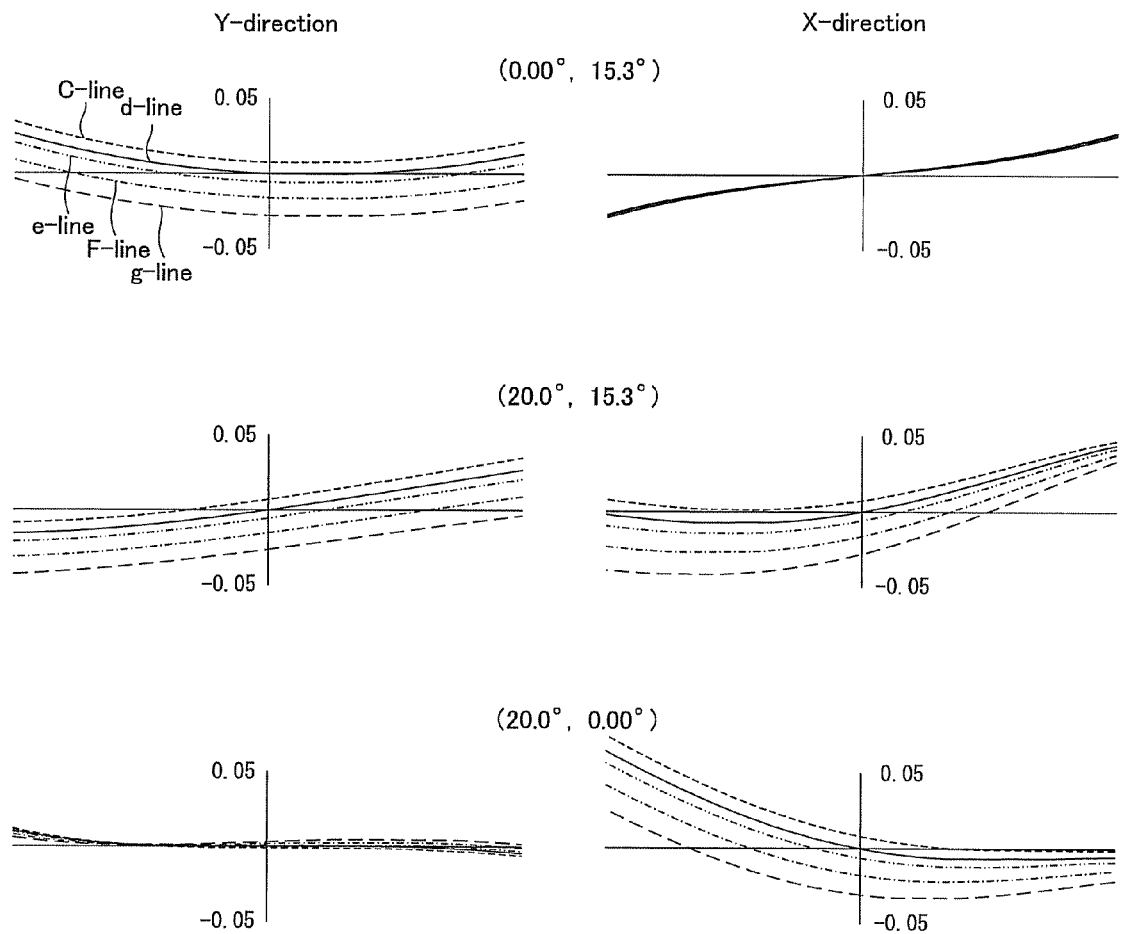
FIG. 11 is a set of aberration diagrams for Example 3 of the invention.
Figure 12:
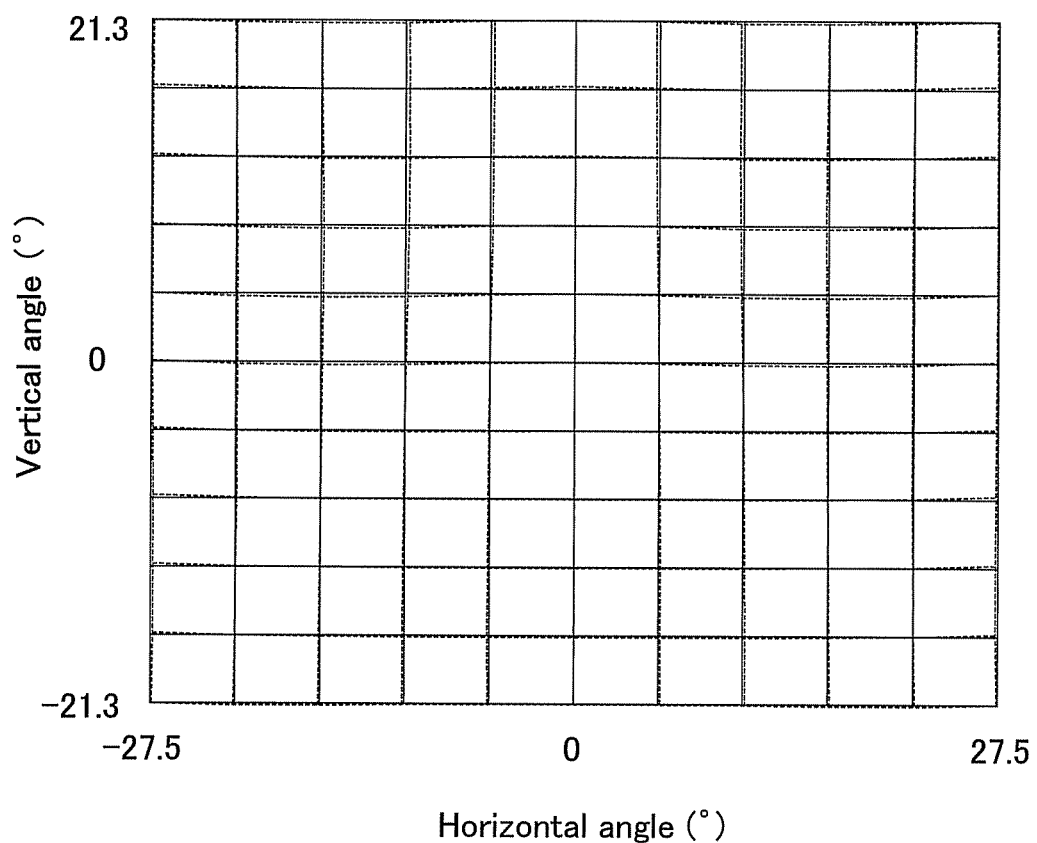
FIG. 12 is a distortion map for the decentered optical system according to Example 3 of the invention.
Figure 13:
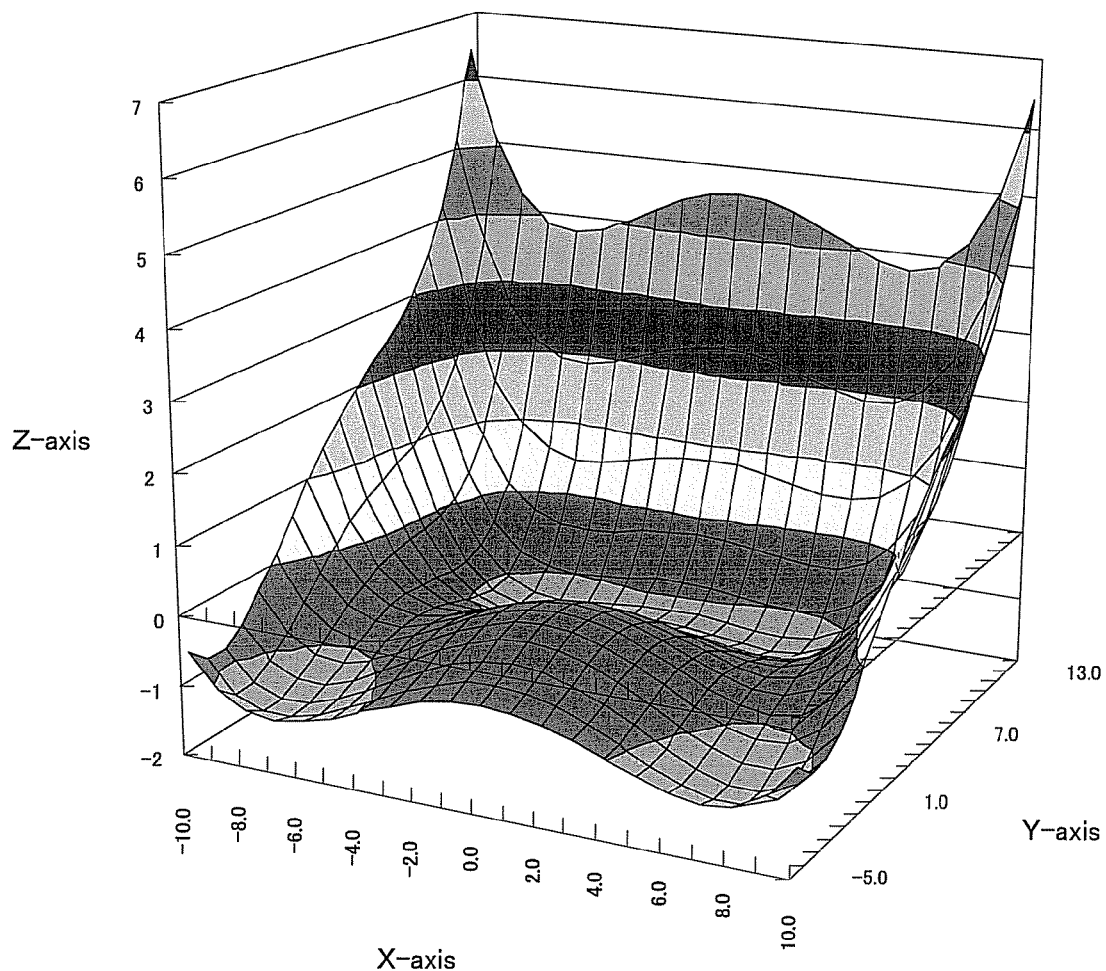
FIG. 13 is illustrative of the shape of the third surface in Example 3 of the invention.
Figure 14:
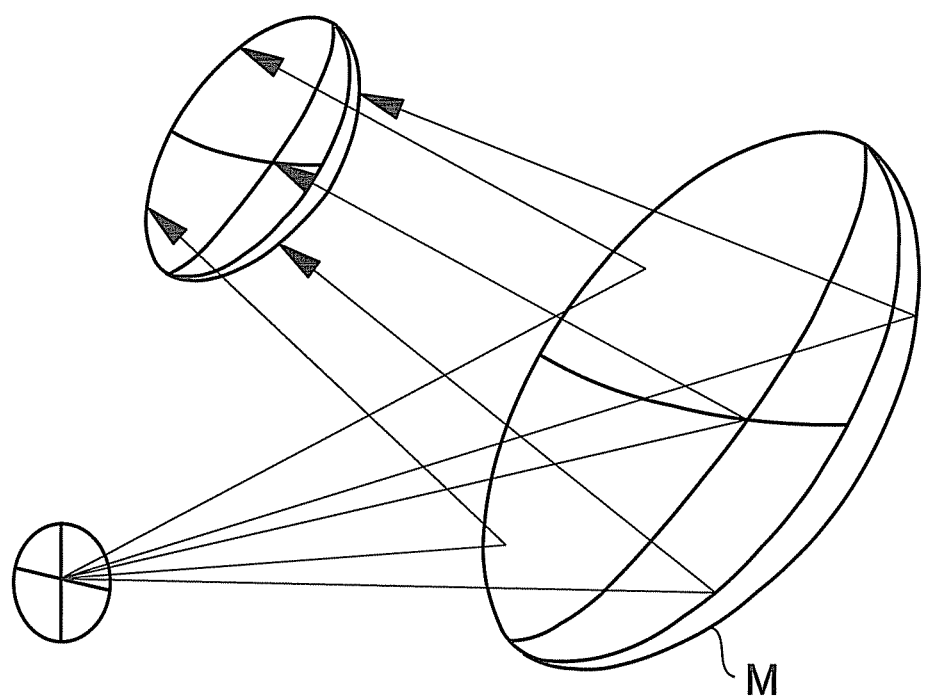
FIG. 14 is illustrative of field curvature produced from the decentered concave mirror.
Figure 15:
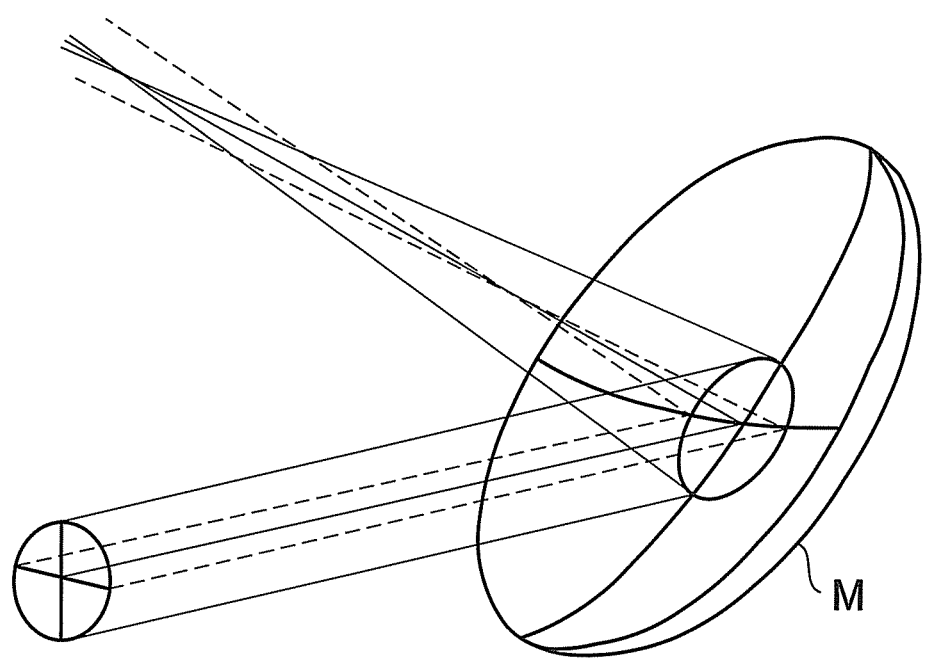
FIG. 15 is illustrative of astigmatism produced from the decentered concave mirror.
Figure 16:
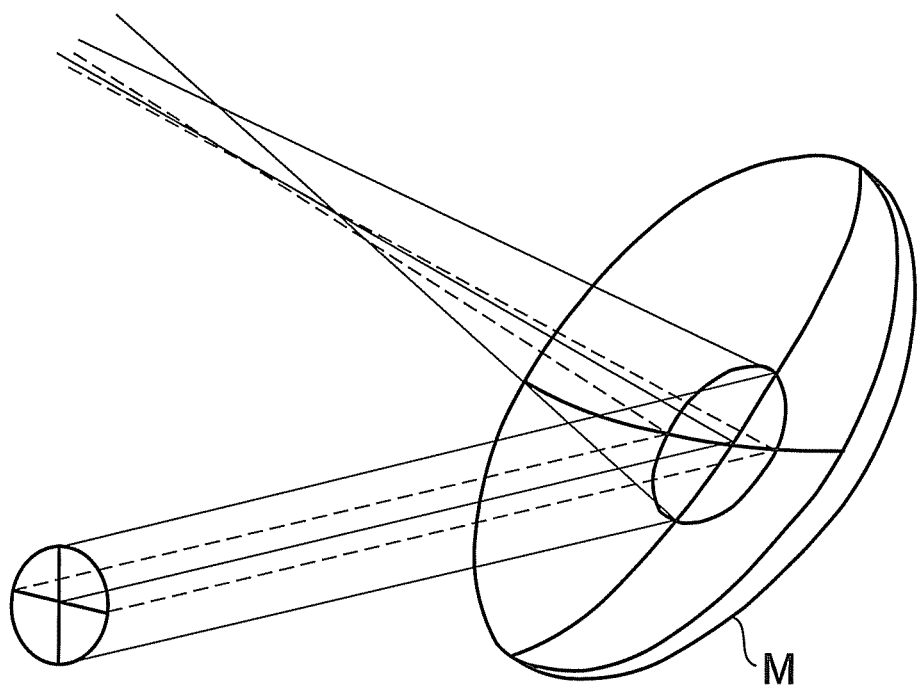
FIG. 16 is illustrative of on-axis coma produced from the decentered concave mirror.

Shown in FIGS. 9, 10 and 11 are central and peripheral transverse aberrations for Example 3 in the X- and Y-directions, respectively. In each set of aberration diagrams, the horizontal and vertical angles of view are bracketed in the centers. The transverse aberrations are shown at the respective wavelengths: 587.6 nm (d-line: a solid line), 435.8 nm (g-line: a broken line), 656.3 nm (C-line: a dotted line), 486.1 nm (F-line: a one-dot line), and 546.1 nm (e-line: a two-dot line). Shown in FIG. 12 is a distortion map for the decentered optical system of Example 3 with the viewer's horizontal angle as horizontal and the viewer's vertical angle as vertical, wherein an image being viewed upon projection of a solid line on the decentered optical system is indicated by a broken line. At every angle of view, the (absolute) maximum value of distortion is −1.87%, indicating that distortion is well corrected as far as the periphery.

In what follows, Examples 1, 2 and 3 are given in numeral form in which "FFS" is an abbreviation of the free-form surface. Note here that alphabet "e" indicates that the following numeral is a power exponent having 10 as a base. For instance, "1.0e−005" means "$1.0 \times 10^{-5}$".

Example 1

| Surface No. | Radius of curvature | Surface separation | Decentration | Refractive index | Abbe constant |
|---|---|---|---|---|---|
| Object Plane | ∞ | −1000.00 | | | |
| 1 | ∞ (Stop Surface) | | | | |
| 2 | FFS [1] | | Decentration (1) | 1.5254 | 56.2 |
| 3 | FFS [2] | | Decentration (2) | | |
| 4 | FFS [3] | | Decentration (3) | 1.5254 | 56.2 |
| 5 | FFS [4] | | Decentration (4) | 1.5254 | 56.2 |
| 6 | FFS [3] | | Decentration (3) | 1.5254 | 56.2 |
| 7 | FFS [5] | | Decentration (5) | | |
| 8 | ∞ | 0.74 | Decentration (6) | 1.5163 | 64.1 |
| Image Plane | ∞ | | | | |

FFS [1]

| | | | |
|---|---|---|---|
| C4 | −2.7575e−003 C6 | −1.9277e−002 C8 | −2.4903e−004 |
| C10 | 2.0434e−003 C11 | −4.1901e−005 C13 | −1.3727e−004 |
| C15 | −5.4831e−005 | | |

FFS [2]

| | | | |
|---|---|---|---|
| C4 | −8.6565e−003 C6 | −7.9980e−003 C8 | 1.3864e−005 |
| C10 | 2.8199e−004 C11 | 4.5270e−005 C13 | −7.9576e−005 |
| C15 | 7.9320e−006 C17 | −3.7809e−006 C19 | −5.2615e−006 |
| C21 | 1.2706e−006 C22 | −1.1061e−007 C24 | −5.9560e−009 |
| C26 | 9.1532e−009 C28 | 1.0253e−007 | |

FFS [3]

| | | | |
|---|---|---|---|
| C4 | −2.3982e−003 C6 | −5.5033e−003 C8 | 3.4282e−006 |
| C10 | 2.6032e−004 C11 | −6.3046e−005 C13 | −2.6994e−005 |
| C15 | 1.5362e−005 C17 | −3.0038e−006 C19 | 6.9109e−008 |
| C21 | 3.5736e−007 C22 | 8.9464e−008 C24 | 2.4096e−008 |
| C26 | 2.0845e−008 C28 | 3.4638e−009 | |

FFS [4]

| | | | |
|---|---|---|---|
| C4 | −1.1575e−002 C6 | −1.4583e−002 C8 | 7.7041e−005 |
| C10 | 1.9180e−004 C11 | −1.5301e−005 C13 | −1.2662e−005 |
| C15 | −5.7629e−006 C17 | 1.6140e−007 C19 | 6.1537e−007 |
| C21 | −1.3539e−007 C22 | 8.5383e−009 C24 | −3.8873e−010 |
| C26 | −4.7835e−008 C28 | −1.1279e−008 | |

FFS [5]

| | | | |
|---|---|---|---|
| C4 | −3.9163e−002 C6 | −3.9905e−002 C8 | 2.2968e−003 |
| C10 | −1.0478e−003 C11 | 4.0363e−004 C13 | 5.0626e−004 |
| C15 | 4.7991e−004 C17 | 1.9249e−005 C19 | −5.6313e−005 |

Decentration [1]

| | | | | | |
|---|---|---|---|---|---|
| X | 0.00 | Y | 0.00 | Z | 12.00 |
| α | 12.16 | β | 0.00 | γ | 0.00 |

Decentration [2]

| | | | | | |
|---|---|---|---|---|---|
| X | 0.00 | Y | 0.14 | Z | 14.30 |
| α | 25.00 | β | 0.00 | γ | 0.00 |

Decentration [3]

| | | | | | |
|---|---|---|---|---|---|
| X | 0.00 | Y | 11.93 | Z | 10.68 |
| α | 27.55 | β | 0.00 | γ | 0.00 |

Decentration [4]

| | | | | | |
|---|---|---|---|---|---|
| X | 0.00 | Y | 1.43 | Z | 23.70 |
| α | −11.27 | β | 0.00 | γ | 0.00 |

Decentration [5]

| | | | | | |
|---|---|---|---|---|---|
| X | 0.00 | Y | 13.95 | Z | 16.56 |
| α | 75.15 | β | 0.00 | γ | 0.00 |

-continued

| | | Decentration [6] | | | |
|---|---|---|---|---|---|
| X | 0.00 | Y | 15.20 | Z | 17.00 |
| α | 68.62 | β | 0.00 | γ | 0.00 |

Example 2

| Surface No. | Radius of curvature | Surface separation | Decentration | Refractive index | Abbe constant |
|---|---|---|---|---|---|
| Object Plane | ∞ | −1000.00 | | | |
| 1 | ∞ | | | | |
| 2 | ∞ (Stop Surface) | | | | |
| 3 | FFS [1] | | Decentration (1) | 1.5254 | 56.2 |
| 4 | FFS [2] | | Decentration (2) | | |
| 5 | FFS [3] | | Decentration (3) | 1.5254 | 56.2 |
| 6 | FFS [4] | | Decentration (4) | 1.5254 | 56.2 |
| 7 | FFS [3] | | Decentration (3) | 1.5254 | 56.2 |
| 8 | FFS [5] | | Decentration (5) | | |
| 9 | ∞ | 0.74 | Decentration (6) | 1.5163 | 64.1 |
| Image Plane | ∞ | | | | |

FFS [1]

| C4 | 3.2764e−004 | C6 | −9.3389e−003 | C8 | 1.5877e−003 |
| C10 | 1.4204e−003 | C11 | −1.0643e−004 | C13 | −2.2510e−005 |
| C15 | 4.4326e−005 | | | | |

FFS [2]

| C4 | 9.6058e−004 | C6 | −8.7157e−003 | C8 | 2.5263e−005 |
| C11 | −1.2350e−004 | C13 | −3.0760e−005 | C15 | 2.8052e−005 |
| C17 | 7.4414e−007 | C19 | 6.2586e−006 | C21 | 4.0980e−006 |

FFS [3]

| C4 | −4.8978e−003 | C6 | −8.1731e−003 | C8 | 3.5777e−004 |
| C10 | 2.9897e−004 | C11 | −5.3345e−005 | C13 | −9.3623e−006 |
| C15 | 1.8969e−005 | C17 | −3.6434e−007 | C19 | 5.7322e−007 |
| C21 | 4.0879e−007 | C22 | 1.9345e−008 | C24 | 6.2983e−008 |
| C26 | 2.5851e−008 | C28 | 2.6386e−009 | | |

FFS [4]

| C4 | −1.4671e−002 | C6 | −1.4589e−002 | C8 | 3.2361e−004 |
| C10 | 2.1254e−004 | C11 | −9.6012e−006 | C13 | −1.1715e−005 |
| C15 | −4.7961e−006 | C17 | −3.2682e−008 | C19 | 8.6240e−007 |
| C21 | 4.6430e−008 | | | | |

FFS [5]

| C4 | −5.8796e−002 | C6 | −8.2019e−003 | C8 | −1.5847e−003 |
| C10 | −4.4478e−003 | C11 | 7.5889e−004 | C13 | 6.0326e−004 |
| C15 | 5.0492e−004 | C17 | 4.7264e−005 | C19 | 1.8293e−005 |
| C21 | 1.4899e−006 | C22 | −4.1199e−006 | C24 | −5.2249e−009 |
| C26 | −6.6421e−006 | C28 | −4.6625e−007 | | |

| | | Decentration [1] | | | |
|---|---|---|---|---|---|
| X | 0.00 | Y | 0.00 | Z | 12.00 |
| α | 6.45 | β | 0.00 | γ | 0.00 |

| | | Decentration [2] | | | |
|---|---|---|---|---|---|
| X | 0.00 | Y | 0.68 | Z | 14.07 |
| α | 10.10 | β | 3.00 | γ | 0.00 |

| | | Decentration [3] | | | |
|---|---|---|---|---|---|
| X | 0.00 | Y | 10.01 | Z | 12.69 |
| α | 20.24 | β | 0.00 | γ | 0.00 |

| | | Decentration [4] | | | |
|---|---|---|---|---|---|
| X | 0.00 | Y | 2.67 | Z | 22.42 |
| α | −12.01 | β | 0.00 | γ | 0.00 |

-continued

| | | Decentration [5] | | | |
|---|---|---|---|---|---|
| X | 0.00 | Y | 11.86 | Z | 19.71 |
| α | 67.20 | β | 0.00 | γ | 0.00 |

| | | Decentration [6] | | | |
|---|---|---|---|---|---|
| X | 0.00 | Y | 14.15 | Z | 18.16 |
| α | 62.98 | β | 0.00 | γ | 0.00 |

Example 3

| Surface No. | Radius of curvature | Surface separation | Decentration | Refractive index | Abbe constant |
|---|---|---|---|---|---|
| Object Plane | ∞ | −1000.00 | | | |
| 1 | ∞ (Stop Surface) | | | | |
| 2 | FFS [1] | | Decentration (1) | 1.5254 | 56.2 |
| 3 | FFS [2] | | Decentration (2) | | |
| 4 | FFS [3] | | Decentration (3) | 1.5254 | 56.2 |
| 5 | FFS [4] | | Decentration (4) | 1.5254 | 56.2 |
| 6 | FFS [3] | | Decentration (3) | 1.5254 | 56.2 |
| 7 | FFS [5] | | Decentration (5) | | |
| 8 | ∞ | 0.74 | Decentration (6) | 1.5163 | 64.1 |
| Image Plane | ∞ | | | | |

FFS [1]

| C4 | 1.0276e−002 | C6 | −7.8644e−003 | C8 | 2.6894e−004 |
| C10 | 1.9581e−003 | C11 | −2.1167e−004 | C13 | −1.9504e−005 |
| C15 | 1.0745e−004 | | | | |

FFS [2]

| C4 | 9.6017e−003 | C6 | 7.4822e−003 | C8 | 2.5826e−004 |
| C11 | −8.2212e−005 | C13 | −8.3341e−005 | C15 | 1.1722e−004 |
| C17 | 2.4678e−006 | C19 | −5.6760e−006 | C21 | 6.9844e−006 |

FFS [3]

| C4 | −3.6213e−003 | C6 | −8.3483e−003 | C8 | 4.1354e−004 |
| C10 | 2.2575e−004 | C11 | −8.1506e−005 | C13 | −7.2705e−006 |
| C15 | 2.0578e−005 | C17 | −9.3771e−006 | C19 | −1.5283e−006 |
| C21 | 3.7919e−007 | C22 | 2.1668e−008 | C24 | −3.3503e−007 |
| C26 | −2.4553e−008 | C28 | 1.6465e−009 | | |

FFS [4]

| C4 | −1.3282e−002 | C6 | −1.4591e−002 | C8 | 1.1102e−004 |
| C10 | 1.6441e−004 | C11 | −2.1345e−005 | C13 | −4.3870e−006 |
| C15 | −3.6691e−006 | C17 | −1.8030e−007 | C19 | 4.7596e−007 |
| C21 | 1.5316e−007 | | | | |

FFS [5]

| C4 | −3.2963e−002 | C6 | −3.6739e−002 | C8 | 2.3323e−003 |
| C10 | −1.4919e−003 | C11 | 4.2887e−004 | C13 | 5.5405e−004 |
| C15 | 7.2332e−004 | C17 | 2.2387e−006 | C19 | −2.1346e−005 |
| C21 | −3.4126e−005 | C22 | −2.4689e−007 | C24 | −1.6318e−006 |
| C26 | −1.5202e−006 | C28 | −8.0673e−007 | | |

| | | Decentration [1] | | | |
|---|---|---|---|---|---|
| X | 0.00 | Y | 0.00 | Z | 12.00 |
| α | 1.41 | β | 0.00 | γ | 0.00 |

| | | Decentration [2] | | | |
|---|---|---|---|---|---|
| X | 0.00 | Y | −0.02 | Z | 13.37 |
| β | 6.63 | β | 0.00 | γ | 0.00 |

| | | Decentration [3] | | | |
|---|---|---|---|---|---|
| X | 0.00 | Y | 11.57 | Z | 12.75 |
| α | 17.83 | β | 0.00 | γ | 0.00 |

-continued

| Decentration [4] | | | | | |
|---|---|---|---|---|---|
| X | 0.00 | Y | 2.86 | Z | 23.05 |
| α | −13.09 | β | 0.00 | γ | 0.00 |
| Decentration [5] | | | | | |
| X | 0.00 | Y | 13.60 | Z | 18.30 |
| α | 64.81 | β | 0.00 | γ | 0.00 |
| Decentration [6] | | | | | |
| X | 0.00 | Y | 15.49 | Z | 19.40 |
| α | 54.73 | β | 0.00 | γ | 0.00 |

As described above, one aspect of the invention relates to the imaging display apparatus comprising the decentered optical system for forming an image on the image display device. By using the decentered prism for the decentered optical system to bend or flex the optical path involved, compactness is achieved, and by using the decentered lens for the eyepiece optical system, asymmetric field curvature in particular is corrected, thereby easing off loads of the decentered prism on correction of aberrations and making the whole optical system compact. According to one aspect of the invention, the decentered optical system best fit for the image display apparatus is provided, and an imaging apparatus using that decentered optical system is provided as well.

According to one aspect of the invention, there can be a wide angle of view ensured even with a small-format display device. When an image display apparatus is set up only by use of an eyepiece optical system without recourse to any relay optical system, it is required for the purpose of achieving a wide viewing angle that the focal length of the eyepiece optical system be curtailed to make magnifications high; however, making the power of the prism optical system too strong would end up with difficulty in correction of aberrations. In one aspect of the invention, the decentered lens is used to make correction of aberrations produced at the prism optical system.

A set of such image display apparatus as described above may be provided for a one-eye arrangement, or left and right parings of such sets may be provided for a two-eyes arrangement while they are spaced and supported with just an interpupillary distance between them. In this way, the image display apparatus may be set up as a fixed type capable of viewing images with one eye or a portable type capable of viewing images with two eyes.

Figure 17:
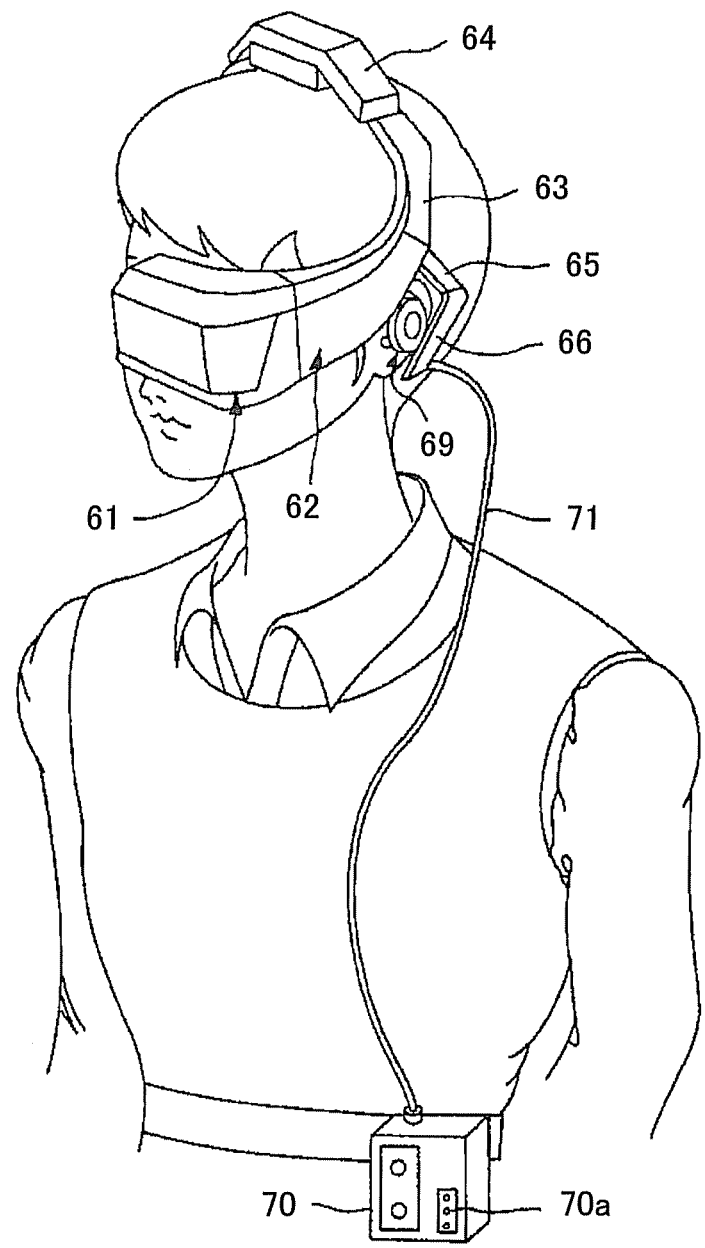
FIG. 17 is illustrative of the way the image display apparatus according to an embodiment of the invention is set up as a one-eye type.
Figure 18:
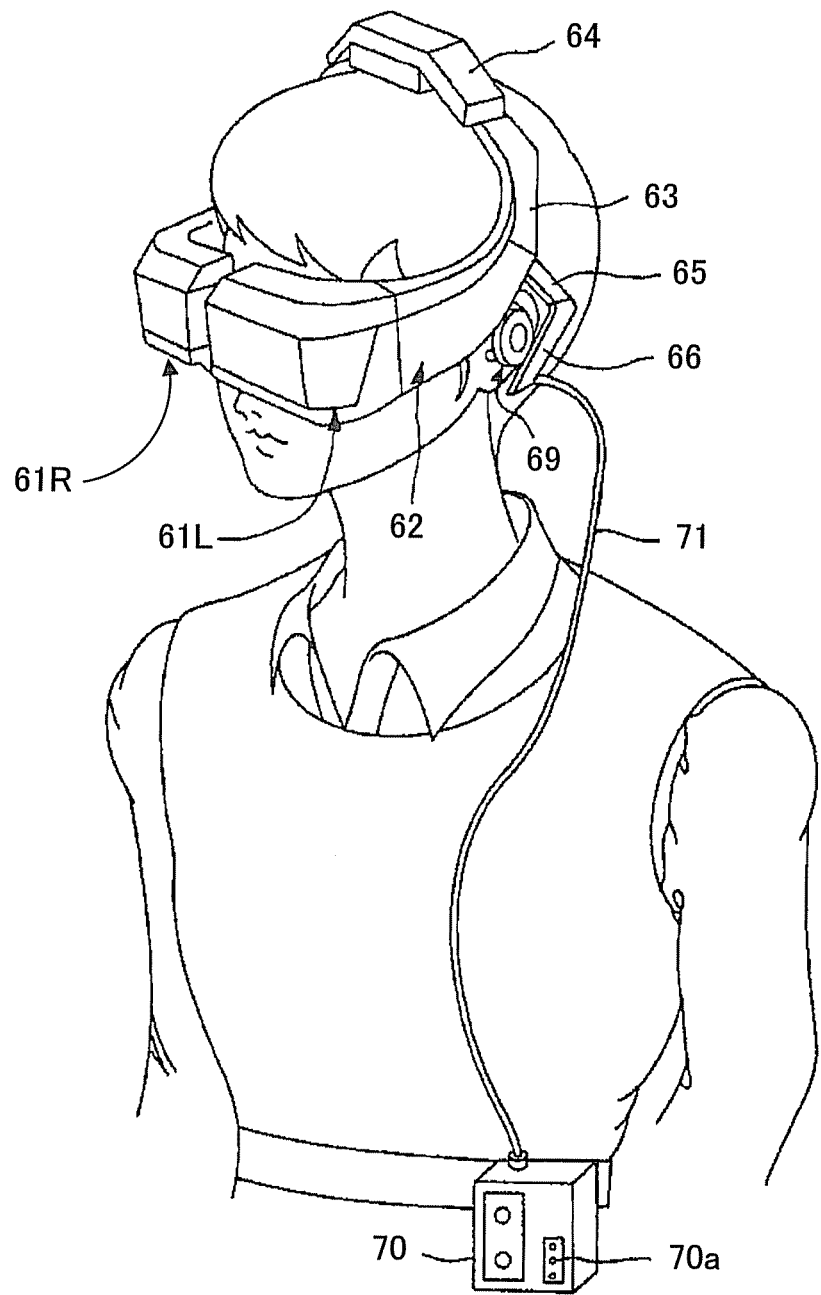
FIG. 18 is illustrative of the way the image display apparatus according to an embodiment of the invention is set up as a two-eyes type.

How the image display apparatus are mounted in place for one eye (the left eye in this case) is shown in FIG. 17, and how they are mounted in place for on two eyes is shown in FIG. 18. Referring to FIG. 17, the display device apparatus body indicated by 61 is fixed over the head by a support member such that it is held in front of the viewer's left eye. That support member comprises the front and back frames 62 and 63, each joining at one end to the display apparatus body 61 and extending over the viewer's temple, and the top-of-the-head frame 64 that has both ends joined together with the opposite end of the back frame 63 held between them, and supports the viewer's top of the head. In the two-eyes type shown in FIG. 18, on the other hand, the display apparatus bodies 61R and 61L held in front of both eyes are fixed over the viewer by supporting them by the top-of-the-head frame 64 via the front and back frames 62 and 63.

Both the one-eye type and the two-eyes type are supposed to use the following features. The rear plate 65 formed of an elastic material such as a metal sheet spring is joined to near the junction of the front frame 62 with the back frame 63. This rear plate 65 is joined in place such that the rear cover 66 forming a part of the aforesaid support member is positioned and supported behind the ear in an area from the back of the head down to the root of the neck. In the rear plate 65 or the rear cover 66, the speaker 69 is mounted in a position corresponding to the viewer's ear.

The cable 71 through which image signals, sound signals or the like are transmitted from outside extends from the display apparatus body 71 through the top-of-the-head frame 64, back frame 63, front frame 62 and rear plate 65 and goes out of the back end of the rear plate 65 or rear cover 66. And this cable 71 is connected to the video playback 70. Note here that 70a stands for the switches and volume controller of the video playback 70.

It is to be noted that the cable 71 may have its end jacked and mounted to an existing video deck or the lie. In addition, the cable 71 may be connected to a TV wave receiving tuner for the purpose of watching TVs or to a computer to receive computer graphics, messages, etc. To eliminate troublesome cords, the cable may be connected to an antenna to receive signals from outside by way of radio waves. In the two-eyes type, if images made for the right eye and the left eye are displayed on the right and left image display apparatus, it is then possible to present a stereoscopic image to the viewer.

While the present invention has been described with reference to various embodiments, it is to be understood that the invention is never limited to these embodiments alone, so they could be properly combined in such a way as to be embraced in the category of the invention.

| [Explanation of the reference numerals] | |
|---|---|
| 2: | Viewer's eyeball |
| 3: | Exit pupil |
| 22: | On-axis chief ray (the viewer's axis of vision) |
| 3: | Decentered optical system |
| 30: | Decentered lens |
| 31: | First surface |
| 32: | Second surface |
| 40: | Decentered prism |
| 41: | First surface |
| 42: | Second surface |
| 43: | Third surface |
| 5: | Image display device |
| 61: | Body |
| 62: | Front frame |
| 63: | Back frame |
| 64: | Top-of-the-head frame |
| 65: | Rear plate |
| 66: | Rear cover |
| 70: | Video playback |
| 71: | Cable |
| 101: | Viewer's axis of vision |
| 102: | On-axis chief ray |
| 103: | Intermediate image plane |

What is claimed is:

1. A decentered optical system provided that projects an image on an image display device onto the viewer's eyeball as a virtual image comprising:
    a decentered prism which is located in opposition to the image display device, in which there are at least three optical surfaces mutually decentered with at least two thereof being in rotationally asymmetric shape, and which is filled inside with a medium having a refractive index of greater than 1, and
    a decentered lens which is interposed between the viewer's eyeball and the decentered prism, and is made up of mutually decentered two surfaces and filled inside with a medium having a refractive index of greater than 1, and in which on the image display device side with respect to an on-axis chief ray incident from a center of the image display device on a center of an exit pupil, there is a lens portion having positive power, and on an opposite side thereof, there is a lens portion having negative power, wherein a Y-direction power profile of the decentered lens becomes small in descending order of a Y-direction angle of view, provided that a Z-axis is defined by an axis provided by a straight line that connects the on-axis chief ray exiting out of the decentered optical system with a center of the exit pupil, a Y-axis is defined by an axis that is orthogonal to the Z-axis and lies in each of decentered surface portions of the surfaces forming the decentered optical system, and an X-axis is defined by an axis that is orthogonal to the Z-axis and the Y-axis alike.

2. The decentered optical system according to claim 1, which satisfies the following condition (1):

$$0.00055 \le (\phi lenx - \phi lenm)/\phi y \le 0.015 \tag{1}$$

where ϕlenx is a maximum value of power of the decentered lens,

ϕlenm is a minimum value of power of the decentered lens, and

ϕy is a power of the whole optical system in a Y-direction, provided that a Z-axis is defined by an axis provided by a straight line that connects the on-axis chief ray exiting out of the decentered optical system with a center of the exit pupil, a Y-axis is defined by an axis that is orthogonal to the Z-axis and lies in each of decentered surface portions of the surfaces forming the decentered optical system, and an X-axis is defined by an axis that is orthogonal to the Z-axis and orthogonal to the Y-axis.

3. The decentered optical system according to claim 1, which satisfies the following condition (1'):

$$0.0008 \le (\phi lenx - \phi lenm)/\phi y \le 0.01 \tag{1'}$$

where ϕlenx is a maximum value of power of the decentered lens,

ϕlenm is a minimum value of power of the decentered lens, and

ϕy is a power of the whole optical system in a Y-direction, provided that a Z-axis is defined by an axis provided by a straight line that connects the on-axis chief ray exiting out of the decentered optical system with a center of the exit pupil, a Y-axis is defined by an axis that is orthogonal to the Z-axis and lies in each of decentered surface portions of the surfaces forming the decentered optical system, and an X-axis is defined by an axis that is orthogonal to the Z-axis and orthogonal to the Y-axis.

4. The decentered optical system according to claim 1, which satisfies the following condition (2):

$$-4 \le \phi ylen/\phi y \le 3 \tag{2}$$

where ϕylen is a power of the decentered lens in a Y-direction, and

ϕy is a power of the whole optical system in a Y-direction, provided that a Z-axis is defined by an axis provided by a straight line that connects the on-axis chief ray exiting out of the decentered optical system with a center of the exit pupil, a Y-axis is defined by an axis that is orthogonal to the Z-axis and lies in each of decentered surface portions of the surfaces forming the decentered optical system, and an X-axis is defined by an axis that is orthogonal to the Z-axis and orthogonal to the Y-axis.

5. The decentered optical system according to claim 1, which satisfies the following condition (2'):

$$-3 \le \phi ylen/\phi y \le 3 \tag{2'}$$

where ϕylen is a power of the decentered lens in a Y-direction, and

ϕy is a power of the whole optical system in a Y-direction, provided that a Z-axis is defined by an axis provided by a straight line that connects the on-axis chief ray exiting out of the decentered optical system with a center of the exit pupil, a Y-axis is defined by an axis that is orthogonal to the Z-axis and lies in each of decentered surface portions of the surfaces forming the decentered optical system, and an X-axis is defined by an axis that is orthogonal to the Z-axis and orthogonal to the Y-axis.

6. The decentered optical system according to claim 1, which satisfies the following condition (3):

$$-80 \le flex \cdot fy/fley \cdot fx \le 40 \tag{3}$$

where flex is a focal length of the decentered lens in an X-direction, fley is the focal length of the decentered lens in a Y-direction, and fy is the focal length of the whole optical system in the Y-direction, provided that a Z-axis is defined by an axis provided by a straight line that connects the on-axis chief ray exiting out of the decentered optical system with a center of the exit pupil, a Y-axis is defined by an axis that is orthogonal to the Z-axis and lies in each of decentered surface portions of the surfaces forming the decentered optical system, and an X-axis is defined by an axis that is orthogonal to the Z-axis and orthogonal to the Y-axis.

7. The decentered optical system according to claim 1, which satisfies the following condition (3'):

$$-70 \le flex \cdot fy/fley \cdot fx \le 30 \tag{3'}$$

where flex is a focal length of the decentered lens in an X-direction, fley is the focal length of the decentered lens in a Y-direction, and fy is the focal length of the whole optical system in the Y-direction, provided that a Z-axis is defined by an axis provided by a straight line that connects the on-axis chief ray exiting out of the decentered optical system with a center of the exit pupil, a Y-axis is defined by an axis that is orthogonal to the Z-axis and lies in each of decentered surface portions of the surfaces forming the decentered optical system, and an X-axis is defined by an axis that is orthogonal to the Z-axis and orthogonal to the Y-axis.

8. The decentered optical system according to claim 1, wherein at least two points of inflection where power changes from positive to negative or negative to positive are provided in an effective surface portion of a third surface of the decentered prism that is an entrance surface.

9. An image display apparatus, comprising:
a decentered optical system as recited in claim 1, and
an image display device located on an image plane in back ray tracing through the decentered optical system, wherein a viewer's eye is located at an entrance pupil position of the decentered optical system.

10. An imaging apparatus for imaging light from an object on an imaging device via an aperture stop and a decentered optical system, wherein:
the decentered optical system comprises:
a decentered prism which is located in opposition to the image display device, in which there are at least three optical surfaces mutually decentered with at least two thereof being in rotationally asymmetric shape, and which is filled inside with a medium having a refractive index of greater than 1, and a decentered lens which is interposed between the aperture stop and the decentered prism, and is made up of mutually decentered two surfaces and filled inside with a medium having a refractive index of greater than 1, and in which on the image display device side with respect to an on-axis chief ray incident from a center of the aperture stop on a center of the imaging device, there is a lens portion having positive power, and on an opposite side thereof, there is a lens portion having negative power, wherein a Y-direction power profile of the decentered lens becomes small in descending order of a Y-direction angle of view, provided that a Z-axis is defined by an axis provided by a straight line that connects the on-axis chief ray exiting out of the decentered optical system with a center of the exit pupil, a Y-axis is defined by an axis that is orthogonal to the Z-axis and lies in each of decentered surface portions of the surfaces forming the decentered optical system, and an X-axis is defined by an axis that is orthogonal to the Z-axis and the Y-axis alike.

* * * * *